(12) United States Patent
Alam et al.

(10) Patent No.: US 8,185,316 B2
(45) Date of Patent: May 22, 2012

(54) TIME-SPACE VARYING SPECTRA FOR SEISMIC PROCESSING

(75) Inventors: Aftab Alam, Sugar Land, TX (US); James D. Taylor, Houston, TX (US)

(73) Assignee: Prime Geoscience Corporation, Houston, TX (US)

( * ) Notice: Subject to any disclaimer, the term of this patent is extended or adjusted under 35 U.S.C. 154(b) by 674 days.

(21) Appl. No.: 12/124,439

(22) Filed: May 21, 2008

(65) Prior Publication Data

US 2009/0292475 A1  Nov. 26, 2009

Related U.S. Application Data

(60) Provisional application No. 60/940,085, filed on May 25, 2007.

(51) Int. Cl.
*G01V 1/00* (2006.01)
(52) U.S. Cl. ............ 702/14; 702/16; 702/17; 702/18
(58) Field of Classification Search .............. 702/14
See application file for complete search history.

(56) References Cited

U.S. PATENT DOCUMENTS

| | | | |
|---|---|---|---|
| 4,953,139 A * | 8/1990 | Laster et al. ............... | 367/73 |
| 5,251,184 A | 10/1993 | Hildebrand et al. | |
| 5,353,233 A | 10/1994 | Oian et al. | |
| 5,563,949 A | 10/1996 | Bahorich et al. | |
| 5,574,639 A | 11/1996 | Qian et al. | |
| 5,724,309 A | 3/1998 | Higgs et al. | |
| H1720 H | 4/1998 | Chen | |
| 5,797,840 A | 8/1998 | Askelrod et al. | |
| 5,826,232 A | 10/1998 | Gulli | |
| 5,850,622 A * | 12/1998 | Vassiliou et al. ............... | 702/17 |
| 5,930,730 A | 7/1999 | Marfurt et al. | |
| 6,018,498 A | 1/2000 | Neff et al. | |
| 6,092,025 A | 7/2000 | Neff et al. | |
| 6,131,071 A | 10/2000 | Partyka et al. | |
| 6,208,951 B1 | 3/2001 | Kumar et al. | |
| 6,266,414 B1 | 7/2001 | Bradley et al. | |
| 6,278,949 B1 | 8/2001 | Alam | |
| 6,745,129 B1 | 6/2004 | Li et al. | |

OTHER PUBLICATIONS

Liu, P., "Wavelet Spectrum Analysis and Wind Waves", Wavelets in Geophysics, ISBN 0-12-262850-0, Academic Press (1994).
Alam, A. et al, "Recursive Removal and Estimation of Minimum Phaser Wavelet", Geophysics, v. 46, No. 10 (1981) pp. 1379-1391.

* cited by examiner

*Primary Examiner* — Drew A Dunn
*Assistant Examiner* — Hyun Park
(74) *Attorney, Agent, or Firm* — Richard A. Fagin

(57) ABSTRACT

A method and visualization apparatus for spectral analysis of time-and-space varying signals enables high resolution investigation of 3D seismic data for the exploration of oil and gas. The method extrapolates multi-resolution short windows into an average long window then computes its FFT. Extrapolation uses the continuity relationship between data inside and outside of short windows. Applications of the method are illustrated with graphical screen 3D volume displays of amplitude spectra, dip and azimuth, curvature and faults (figure below). Aside from high resolution these displays improve the productivity of a seismic interpreter.

6 Claims, 12 Drawing Sheets

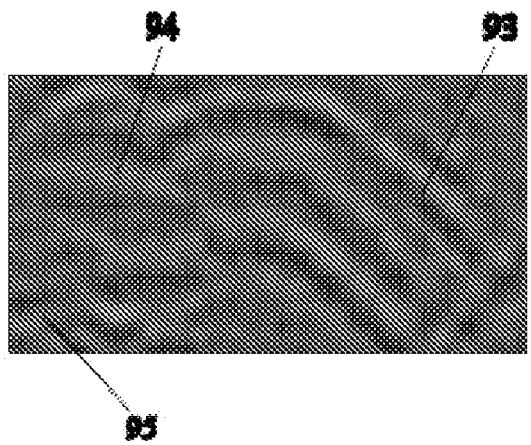
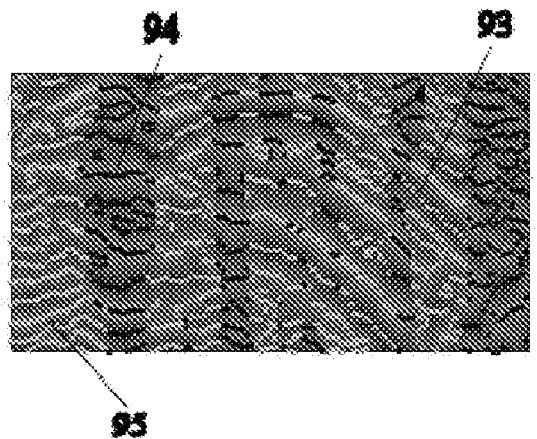
Fig.11(a)                    Fig.11(b)
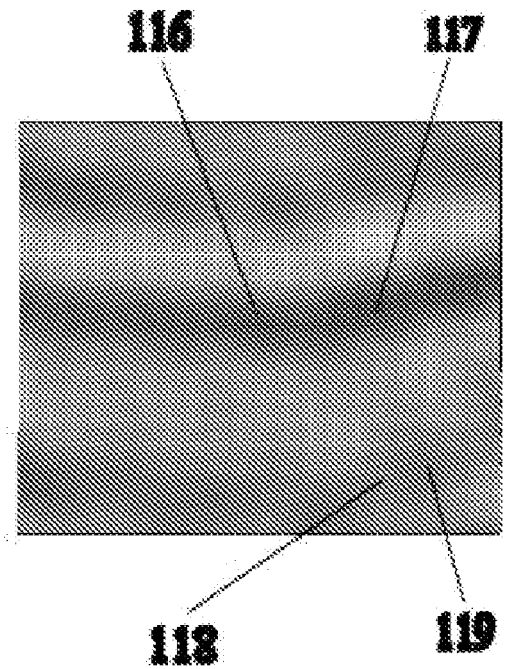
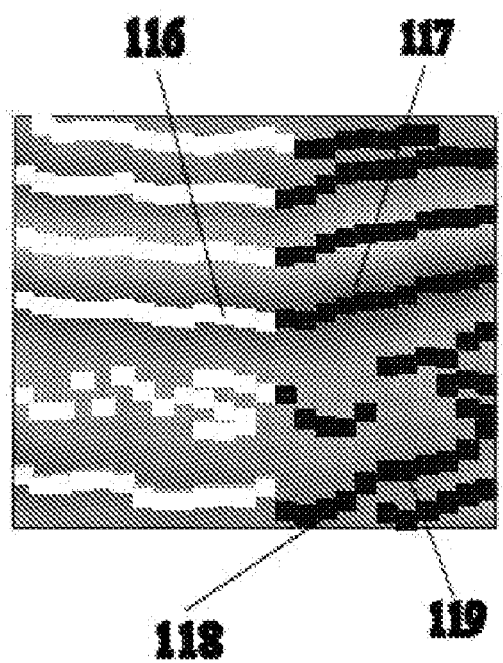
Fig.12(a)                    Fig.12(b)

TIME-SPACE VARYING SPECTRA FOR SEISMIC PROCESSING

CROSS REFERENCE TO RELATED APPLICATIONS

Priority is claimed from U.S. Provisional Application No. 60/904,085 filed on May 25, 2007.

STATEMENT REGARDING FEDERALLY SPONSORED RESEARCH OR DEVELOPMENT

Not applicable

BACKGROUND OF THE INVENTION

1. Field of the Invention

The invention relates generally to processing of single- or multi-channel non-stationary waveforms that occur, for example, in seismic exploration, speech, radar, sonar, radio, space communication, electron microscopy and medical remote sensing fields.

In particular, methods of the invention estimate the time-space varying frequency and wavenumber spectra, time delay between signals, dispersion, attenuation, dip and azimuth, curvature and higher-order reflection surfaces, and faults from signals in a 3D seismic volume. Further, this invention includes an apparatus to visualize and interpret results produced by the estimation methods.

2. Description of the Related Art

In seismic exploration for oil and gas the Earth's subsurface is illuminated by an acoustic source disposed at or near the surface of the Earth. Acoustic waves propagate down into the Earth and are reflected back to the surface from a sequence of layer interfaces. Reflected waves are recorded by an array of receivers typically arranged in a linear, 2 dimensional pattern or 3 dimensional pattern. The receivers can be positioned on the Earth's surface, on the ocean bottom, towed near the water surface, disposed inside a well or arranged in any geometrical pattern in two or three dimensions. In a seismic survey the combination of source and receiver array is typically relocated at a multiplicity of overlapping areas in order to uniformly illuminate the subsurface in a region of interest.

The seismic "wave" starts from what can be approximated as a point source. The wavefront from the acoustic source starts approximately as a sphere. The spherical shape becomes distorted and the radius of the sphere expands as the wavefront propagates down through layers in the subsurface to a reflector, whereupon the wavefront returns to the receivers. Reflected wavefronts from many reflectors in the Earth's subsurface overlap when they reach the receivers.

Each receiver output can be digitally sampled at equal time intervals. A 'trace' is a series of digital sample values indexed with respect to time. A trace typically comprises overlapping wave signals arriving at the receiver from different directions and sometime different sources, for example, another survey being concurrently shot in the neighborhood.

A 'shot gather' is a set of traces from multiple receiver locations that are displayed horizontally in their linear- or 2D-receiver positions relative to the acoustic source. Signals reflected from a single reflector in a shot gather typically align along a hyperbola in the case where the signals are acquired by a linear receiver array. Such signals align over a hyperboloid surface on a 'shot gather' when the signals are acquired by a 2D receiver array. Such alignments are referred to as alignment surfaces of coherent signals. From here onward when referring to a "surface" on a 2D receiver array, it is automatically implied to mean an alignment along a curve if the 2D receiver array were replaced with a linear receiver array.

The curvature of the alignment surface contains information about the velocity of the medium traversed by the wavefront. Further, the curvature decreases with the down-up (two-way) acoustic travel time to the reflector. Consequently, the trace-to-trace time delay between coherent signals varies with time. This requires that the time delay should be estimated over short signal windows. Further, the amplitude and phase spectra of signals within a short time window of the hyperboloid surface contain the "fingerprint" of the layer interface in a small volume around the reflection point.

Aside from reflected signals, the 'shot gather' also contains organized and random noises. Organized noise or 'unwanted signal' generally has a planar or quadratic surface alignment across a 2D array 'shot gather'. The amplitude and phase spectra and alignment surface of the noise may be significantly different from those of signals reflected from layer interfaces. Signals must be analyzed along their alignments in order to characterize them and subsequently separate or suppress them.

A feature of modern seismic surveys is multi-fold recording. A common subsurface area of the Earth is surveyed by many receivers that are separated from sources by different offset distances and along different azimuths. Shot gathers are sorted such that their source-to-receiver mid-points fall into common "bins" in a grid pattern. Sorted gathers are called common mid-point (CMP) bin gathers. CMP gathers are analyzed and processed in various ways in a data processing center. Such processes include noise suppression, and velocity analysis that exploits the curvature on a CMP gather.

In land seismic surveys the velocities and thicknesses of near-surface layers vary rapidly over an area. This causes uneven time delays in the alignment of reflected signals from trace to trace. A process called 'static correction' is applied to each trace. It is the time shift that compensates for inhomogeneity of near-surface layers and sets the origin of each trace to a common datum. A further complication arises from surface waves that are dispersive, that is different frequencies travel with different speeds. Thus frequencies are delayed by different amounts as they travel between receivers. The term 'normal dispersion' is used when lower frequencies travel faster than higher frequencies. The term 'anomalous dispersion' is used for the opposite case of lower frequencies traveling slower than higher frequencies.

In order to identify static corrections or parameters of a reflection alignment surface it is necessary to estimate of trace-to-trace time delay between signals in a short time window. The study of dispersion phenomenon, however, requires that time delays must be estimated over a range of frequencies. In this invention we use the term 'time delay spectrum' to describe time delay that varies with frequency. The time delay spectrum is computed from short time phase spectra of two signals.

Attenuation is a phenomenon where the energy loss in a signal due to absorption increases with frequency as it travels through the Earth. Its effect is computed from short time amplitude spectra of a signal that is reflected from separate interfaces in the Earth.

An important process applied to seismic traces is called migration. Migration in effect "propagates" the wavefront downward from the receiver into the Earth's subsurface. In typical migration processing, the wavefront is approximated by a sequence of plane waves. This requires determination of lateral derivatives, or dip and azimuth, of wavefronts at each point of signal alignment. The migration process back tracks the wave path and stops at the point of reflection. Signals from different source-receiver geometries that are reflected from the common subsurface area are summed together into an image signal. A vertical collection of image signals as a function of time is an "image trace." On an image trace, signals from reflectors with different dips and azimuths that are observed from various source-receiver separations are positioned vertically below their surface location at their two-way times. Further, the migration process reduces the volume of data by a 'fold' equal to an average number of repeated reflection points in a common bin. Migrated data is typically interpreted on a workstation equipped to handle 3D volumes, color displays and animation. The interpretation process also requires estimation of time delays, dip and azimuth, and curvature. In addition, the process requires the detection and mapping of discontinuities such as faults or buried channels.

In summary, there is a need for time-frequency spectral analysis, estimation of time delay spectrum, dispersion, attenuation, dip, azimuth and curvature of reflections plus detection and mapping of faults. Reviewed below are prior art methods that perform some of these operations.

A

Time-Frequency Spectra

The time dependent character of seismic signals is a result of attenuation in the Earth and superposition of signals of varying spectral content arriving from different directions at a common receiver. Aside from seismic exploration, signals with time varying spectra are observed in other technical fields, for example, speech, radar, sonar, radio, space communication, electron microscopy and medical remote sensing fields. These signals are analyzed over continuous short time windows in order to sense their spectral variation with time.

In some cases the signal may be a function of space or some other variable instead of time. In this embodiment the time is a generic discretely sampled independent variable and signal is a dependent variable. Herein are reviewed several prior art methods for the analysis of time-varying signals.

One of the most widely used method to analyze signals is the Fourier Transform (or FT). For digitally sampled data, a more efficient computer implementation called the Fast Fourier Transform or "FFT" is routinely used for spectral analysis. The FFT of short duration ("window") signals, however, has poor frequency resolution. There has been intensive worldwide research since the introduction of the Cooley-Tukey method to enhance the frequency resolution of signals in short windows and yet maintain the versatility of the FFT. It will be shown herein later that no method known in the art prior to the present invention satisfies both the time-frequency resolution and FFT versatility criteria.

FFT has five advantages. First, it decomposes the signal into monochromatic discrete frequencies and provides amplitude and phase for each component. For example, if the total number of samples m in a zero-mean signal window is an integer power of 2, then the FFT comprises amplitude and phase spectra of $mf=m/2$ discrete frequencies. Second, the discrete frequencies are uniformly spaced at $\Delta f=2/(m*\Delta T)$ Hz, where $\Delta T$ is the time sample rate. Third, the frequency coefficients form an orthogonal set, that is, amplitude and phase at any frequency are independent of those at any other frequency. This feature is useful for parallel processing in the frequency domain and also for statistical analysis because the spectral component at each frequency is statistically uncorrelated with the component at any other. Fourth, the FFT is exactly invertible from the frequency domain to the time domain without loss of information. The fifth and most important advantage is that a library of many FFT-based applications from wave propagation to signal analysis is available and new applications are added continuously to this library.

As stated earlier, a disadvantage of FFT is its inability to compute with arbitrarily high frequency resolution the spectrum from a finite time window of the signal. For example, if the exact frequency location of a signal happens to lie between discrete frequency samples its energy gets smeared over neighbor discrete frequencies. In order to improve frequency localization the frequency domain needs to be sampled with higher resolution, that is, with a smaller $\Delta f$. Since $\Delta f$ is inversely proportional to "$m*\Delta T$" this would require doing the FFT over a long time window. Such FFT would reduce the time resolution since it would compute an average spectrum over a long time interval that would not sense spectral variations over small changes in time. If on the other hand, we choose to increase the time resolution with a smaller $m*\Delta T$ then not only does its FFT have a lower frequency resolution but also produces spectral side lobes called Gibbs phenomenon. Since the time and frequency resolutions are reciprocals of each other, FFT over a short time window inhibits the ability to locate with precision the amplitude and phase of the signal in the frequency domain.

The need for a technique that simultaneously localizes the signal with high resolution in both the time and frequency domains and be as versatile as FFT has been recognized for a long time. Methods for improved resolution in time-frequency spectral analysis have recently been developed for customized applications in oil and gas exploration and signal processing fields. However, none of these methods satisfy all five advantages of FFT. They are limited in their scope of applications as a result.

Four methods exemplify such prior art methods. The first method is the Short Time Fourier Transform "STFT". It segments data by multiplying the time signal with a finite length box car window then computes the FFT. The amplitude and phase spectra are assigned to the center of the time window. The process repeats as the window translates in time with a fixed step size. Partyka, et al., in U.S. Pat. No. 6,131,071 (October, 2000) entitled Spectral Decomposition for Seismic Interpretation apply the method to a set of seismic traces to visualize tuning effects produced by wavelet interference from the top and bottom interfaces of a thin geological layer. The advantage of the method is that you can reconstruct the original signal from its FFT components without information loss and repeatedly apply FFT to its coefficients as if it was the original input. The disadvantage is that the method has poor frequency resolution and produces high magnitude Gibbs side lobes.

Vassiliou, A. A., and P. Garossino in U.S. Pat. No. 5,850,622 (December, 1998) entitled Time-Frequency Processing and Analysis of Seismic Data using Very Short-Time Fourier Transforms discloses applying a Gaussian tapered window instead of the box car. The advantage is that Gibbs side lobes are much reduced in comparison with box car STFT. The disadvantage is that energy in the spectrum is no longer monochromatic but smeared over a band of frequencies.

The second method is known as Wigner Distribution (Hlawatsch et al., IEEE Signal Processing Magazine, April 1992, p. 35-36). It computes the power spectrum from a local auto-correlation function of a tapered window time signal. Oian, et al., in U.S. Pat. No. 5,353,233 (October, 1994) entitled Method and Apparatus for Time Varying Spectral Analysis discloses a bell shaped Gaussian taper to first localize the time window. Multiplication of the time signal with Gaussian function reduces the magnitude of Gibbs side lobes. While the method localizes the time window it spreads the spectrum amongst neighbors in the frequency domain. Droujinina, A., C. Macbeth, and P. Corbett in *A time-frequency approach to the analysis of time-lapse VSP*: EAGE 62$^{nd}$ Conference and Technical Exhibition, 2000, P-104, discloses applying the method for separating multi-channel interfering signals and suppress noise in seismic data. A disadvantage of the method is that it produces only the power spectrum and not the phase spectrum. Consequently the method cannot uniquely reconstruct the original signal from only the amplitude spectrum. As a result filtering cannot be applied in the time-frequency domain and the result inverted back into the time domain as is the case with FFT. A second disadvantage with this method is that when there is any overlap between frequency bands at different times Wigner Distribution produces "cross-term" hashed response in the time-frequency plane. The same response occurs when there is any time overlap between signals at different frequency bands The Wigner Distribution method has been applied also to estimate time-varying amplitude spectrum in radar and Doppler target detection. Relevant patents on this subject include: (a) U.S. Pat. No. 5,574,639, issued Nov. 12, 1996, to Qian et al. and entitled System and Method for Constructing Filters for Detecting Signals whose Frequency Content Varies with Time, and (b) U.S. Statutory Invention Registration H1, 720 issued Apr. 7, 1998, to Chen and entitled Time Frequency Processor for Radar Imaging of Moving Targets.

In principle, any of the foregoing methods may be applied to not just one fixed time window but to a set of expanding or contracting time windows that are centered at the same time. The window center is then translated with a fixed time increment and the process is repeated. Such methods are classified under multi-resolution analysis because expanding windows are able to better resolve progressively lower frequencies.

The third method is Wavelet Transform that is a multi-resolution method. Li, C.-F. and C. L. Liner in U.S. Pat. No. 6,745,129 (Jun. 1, 2004) entitled Wavelet based Analysis of Singularities in Seismic Data discloses an application of this method to seismic exploration. Rather than first window the time signal then transform into frequency domain, this method multiplies the time signal with a finite set of varying length wavelets centered at a given time and integrates the product. Each wavelet produces a coefficient in a domain called 'scale' domain that is related to frequency. There is a basic mother wavelet and other wavelets in the set are 'scaled' compressions or dilations of the mother wavelet. Wavelets in the set are orthogonal to each other. The center time is then translated to a different position and the process is repeated. This method provides better frequency resolution than previous methods because of varying lengths of multiplier wavelets. Further, the original signal can be reconstructed from 'scale' coefficients without loss. This method has two disadvantages. First, its resolution is not uniform over the entire time-frequency plane. Second, since the 'scale' coefficients are not equivalent of FT coefficients it is difficult to use them in many FT based signal processing applications.

The Wavelet Transform method has been applied also to non-seismic fields. Relevant patents are: (a) in medical diagnostics: U.S. Pat. No. 5,797,840, issued Aug. 25, 1998, to Askelrod et al. and entitled Apparatus and Method for Time Dependent Power Spectrum Analysis of Physiological Signals, (b) in data transmission and archiving: U.S. Pat. No. 6,266,414, issued Jul. 24, 2001, to Bradley et al. and entitled Method for Digital Data Compression, (c) in speech analysis: U.S. Pat. No. 5,826,232, issued Oct. 20, 1998, issued to Gulli, and (d) in signal processing: U.S. Pat. No. 6,208,951, issued Mar. 27, 2001, to Kumar et al. and entitled Method and an Apparatus for the Identification and/or Separation of Complex Composite Signals into its Deterministic and Noisy Components.

The fourth method is Matching Pursuit Decomposition, MPD. Mallat and Zhang, 1993, describes the method in IEEE Trans. on Signal Processing, v. 41, no. 7, pp. 710-32. Liu, J. and K. J. Marfurt in *Matching pursuit decomposition using Morlet wavelets*: 75$^{th}$ Annual International Meeting, SEG 2005, Expanded Abstracts, 786-790, discloses applying the method to seismic exploration. In MPD a dictionary of wavelets is created. These wavelets have combinations of many possible time and frequency widths. The method proceeds as follows. Each wavelet is correlated with the windowed time signal. The one with the highest correlation coefficient is selected as the first component. The correlation coefficient is multiplied by the wavelet and the product subtracted from the original signal window. The residual is next correlated with all other remaining wavelets in the dictionary. The one with the highest correlation is selected as the next component. The procedure is repeated and stops when the mean squared value of the residual falls below a specified threshold. The method provides uniform time-frequency resolution. Five disadvantages of the method are that (a) the wavelet decomposition is non-unique, (b) wavelets in the dictionary are not orthogonal, (c) redundant wavelet set makes computing expensive, (d) selection of a wavelet dictionary is subjective, and (e) signal reconstruction has information loss.

In summary, prior art methods for time-varying spectral analysis provide time-frequency resolution trade-offs that suit specific applications but lack the versatility of FFT. STFT is low resolution and produces Gibbs side-lobes. Wigner Distribution provides only the amplitude spectrum but not the phase spectrum. Wavelet Transform produces non-uniform frequency spacing. Matching Pursuit Decomposition is a non-unique, non-orthogonal analysis method that is subjective with regard to the choice of wavelet dictionary. Furthermore, it is inefficient because it requires cross-correlation with a large redundant set of wavelets. None of the four methods suit the broad range of applications that in addition to time-frequency resolution require lossless inversion,

B

Time Delay

Neidell et al. in a paper, *Semblance and Other Coherency Measures for Multichannel Data*, Geophysics, v. 36, no. 3, June 1971, pp. 482-497, define coherency as a normalized measure of similarity among signals that follow a prescribed time trajectory on multiple channels. The paper describes the relationship between coherency and average normalized cross-correlations of pair-wise time-windowed signals. The coherency value is one for perfect similarity and zero for no similarity.

Prior art methods differ in their normalization of coherency or cross-correlation measures. These methods are used to detect time surfaces of coherent signals. A time surface is called a horizon if "Coherency" of signals with windows centered at the surface time on each trace is greater than a prescribed threshold. The horizon is discontinuous if "Coherency" is small.

The following are two examples of coherent seismic signals that are separated in time from trace to trace. First, a reflected seismic wavefront produces across shot gather traces a hyperbolic trajectory of coherent signals. Second, after the field data is processed in a computing center these signals are "migrated or stacked" to produce a different set of coherent signals that follow geological layer interfaces. In either case, the time surface of coherent signals distributed over spatially separated traces is of fundamental importance in seismic processing and interpretation stages.

In seismic interpretation the process of surface identification is called 'horizon tracking'. In the simplest case the time window may be just one sample, i.e., the peak or trough of a signal. Hildebrand et al. in U.S. Pat. No. 5,251,184 issued Oct. 5, 1993, entitled Method and Apparatus for Finding Horizons in 3D Data, disclose a process that applies one-trace forward and backward coherent signal search to find time shift relative to a reference trace. Their coherency measure is the similarity of peak or trough amplitude. The process is repeated by shifting the reference trace to the next neighbor. A horizon surface is tracked by selecting a "seed" at a desired point in the 3D volume then letting the algorithm repeatedly connect times of coherent signals in the neighborhood. The resulting surface through connected times over an area is called a "time horizon". The disadvantage is that the method produces noisy horizons.

Having tracked one or more horizons over the region, each surface must be quantified with a set of parameters. Throughout this embodiment any reference to dip implies maximum rate of change in the two-way-time of a surface with change in lateral distance. The angle between the direction of the dip and the North is called the azimuth. Dailey et al. in an article entitled *Dip and Azimuth Displays for 3D Seismic Interpretation*, in First Break, v. 7, 1989, p. 86-95, first smooth a tracked horizon. Next they compute the first order lateral derivatives in orthogonal directions for estimating dip and azimuth of the smoothed horizon.

Alam in U.S. Pat. No. 6,278,949 B1, issued Aug. 21, 2001, entitled Method for Multi-Attribute Identification of Structure and Stratigraphy in a Volume of Seismic Data defines coherency in terms of multiple attributes. The method of this patent applies a variable data-adaptive time window to the signal. It computes multiple attributes within this window to estimate "Coherency". The use of multiple attributes reduces noise and improves the reliability of detected horizon. Further, this method estimates dip and azimuth of the time horizon and also first order lateral derivatives of one or more attributes such as peak or trough amplitude along that horizon.

Above methods quantify parameters of horizons that are laterally continuous but discretely spaced in time. A disadvantage is that they are not continuous in time and certain subtle discontinuities that are vertically continuous may be missed.

C

Dip and Azimuth from 3D Seismic Volume

Two lateral-space separated time-windowed signals belong to a discontinuous surface if "Coherency" falls below a prescribed threshold. In geology, such discontinuities occur on edges of channels, point bars, pinch-outs, or stratigraphic terminations. They are narrowly confined within a short time window of a horizon and do not persist across multiple horizons that are separated in vertical time. Such discontinuities may not necessarily follow a horizon surface but are continuous laterally over a limited area. Their detection, important in the location of oil and gas reservoirs, requires space varying frequency-wavenumber analysis.

In U.S. Pat. No. 5,563,949, issued Oct. 8, 1996, to M. S. Bahorich et al. and entitled Method of Seismic Signal Processing and Exploration there is disclosed a method of obtaining a set of discontinuity traces distributed over a 3D volume of the Earth. The 3D volume of input seismic traces is divided into a plurality of horizontal slices that are spaced apart in a vertical sequence. Each slice is divided into a plurality of cells having at least three seismic traces located therein. The maximum time-lagged cross-correlation between the first and second traces lying in the vertical plane provides an in-line value and another maximum time-lagged cross-correlation between the first and third traces lying in another vertical plane provides a cross-line value. Bahorich et al. define coherency as the geometric mean of the in-line and cross-line values. They associate coherency with the time at the center of the first trace window. The discontinuity attribute is (1-coherency). This attribute is displayed instead of seismic amplitude on a time slice for interpretation on a workstation. The method, however, gives false results in areas of steep dips and noise. Further, it suffers from poor correlation estimate due to the dc level shifts produced by short-time windows that are not zero-mean.

In order to overcome the problem resulting from steep dips, Marfurt et al. at the 67$^{th}$ Meeting of the SEG, 1997, in a paper entitled *Coherency Calculation in the Presence of Structural Dip*, improved upon Bahorich method to search for discontinuities by following the dip and azimuth of a horizon. In U.S. Pat. No. 5,930,730, issued Jul. 27, 1999, entitled Method and Apparatus for Seismic Signal Processing and Exploration, Marfurt et al. describe a method of dip and azimuth determination through the computation of eigenstructure-based coherency. It searches for maximum semblance/similarity of traces within a small sub-volume centered at a reference trace time. The computation involves lagged cross-correlations of the time-windowed center trace with its spatial neighbors in the sub-volume. The method is complex to implement, for example, the procedure by Gersztenkorn et al. in *Eigenstructure-based Coherence Computations as an Aid to 3D Structural and Stratigraphic Mapping*, Geophysics, v. 64, no. 5, pp. 1468-79, September-October, 1999.

In summary, the search for surface dip and azimuth from lagged cross-correlations over a suite of laterally spaced traces in a sub-volume is a computer intensive and non-robust process. A repetition of the process by centering the sub-volume at each point in a seismic volume makes the process expensive. Improving robustness through eigenstructure calculation from cross-correlation matrices further adds to the expense and complexity.

In U.S. Pat. No. 6,092,025, issued Jul. 18, 2000, entitled Hydrocarbon Edge Detection using Seismic Amplitude, Neff et al. describe a method similar to Marfurt et al.'s U.S. Pat. No. 5,930,730, to first estimate dip and azimuth of a horizon then compute a discontinuity attribute along that horizon. The discontinuity attribute called delta amplitude dip (DAD) is the normalized local spatial derivative of the amplitude in the dip direction. The spatial derivatives of amplitude and indeed of other attributes such as dominant frequency were also described for vertically discrete peak and trough time horizons in U.S. Pat. No. 6,278,949 B1 issued to Alam.

Higgs et al. in U.S. Pat. No. 5,724,309, issued Mar. 3, 1998, entitled Method for Geophysical Processing and Interpretation using Instantaneous Phase and Its Derivatives and Their Derivatives, disclose a method to estimate dip, azimuth and discontinuities from lateral derivatives of instantaneous phase. In contrast with Marfurt et al. or Neff methods the Higgs et al. method is efficient because it avoids the computation of a large number of lagged cross-correlations. At a constant time, the method computes wavenumbers that are derivatives of the instantaneous phase in two orthogonal lateral directions. It computes the rms value of the two wavenumbers then divides the result by instantaneous temporal frequency to compute the dip. This computation is based on a generally non-robust assumption. It assumes that instantaneous temporal frequencies on the center trace and on traces in the two orthogonal directions are all equal. This assumption does not hold in practice since an interfering signal on one of the traces or noise would make the frequencies to be different. The instantaneous temporal frequency becomes unstable at Hilbert Envelope troughs and even takes an unrealistic negative value. Further, the error from the assumption of equal instantaneous temporal frequencies becomes large when traces over an area rather than in just two orthogonal directions are included in the computation. The trace to trace variations and instability of instantaneous temporal frequency cannot be corrected within the method. It requires additional pre-processing.

As far as coherent signal discontinuity is concerned, each method must detect coherent signal surface before the detection of discontinuity. Disadvantages that are inherent in the detection of coherent signals by prior art methods equally apply to the detection of discontinuity.

D

Curvature and Higher Order Surfaces from 3D Seismic Volume

A. Roberts in a paper entitled *Curvature Attributes and their Application to 3D Interpreted Horizons*, First Break, v. 19, no. 2, February 2001, describes a method to estimate surface curvatures at each point of a selected discrete seismic horizon. The reference describes fitting a second order polynomial time surface by an expression such as:

$$\hat{t}(x,y)=ax^2+by^2+cxy+dx+ey \tag{1}$$

to local relative times to obtain an estimate $\hat{t}(x,y)$ of the time surface. The variables, (x,y) are actual location differences relative to their values at the center trace of the lateral neighborhood. In general, polynomial coefficients (a,b,c,d,e) may be obtained by minimizing any Lp-normalized difference $|t(x,y)-t(0,0)-\hat{t}(x,y)|^p$ between actual time difference on a picked horizon, $t(x,y)-t(0,0)$, and its estimate, $\hat{t}(x,y)$. In particular Roberts sets p=2 to obtain a least squares estimate over a 3×3 local grid.

The Roberts reference cited above defines six curvature attributes in terms of (a,b,c,d,e). Each attribute reveals a different property of the surface. For example, the most positive, K+, and most negative, K−, curvatures are defined by the equations:

$$K+=(a+b)+\sqrt{(a-b)^2+c^2} \tag{2}$$

$$K-=(a+b)-\sqrt{(a-b)^2+c^2} \tag{3}$$

The K+ and K− curvatures are useful in the identification of tops of ridges or anticlines, bases of valleys or synclines, and the upthrown or downthrown sides of faults. The method disclosed in the Roberts publication, however, has two limitations. First, it is not a volume analysis method but relies on predetermined horizons. Second, the method does not go beyond the second order polynomial.

Al-Dossary et al. in a paper entitled *3D Volumetric Multispectral Estimates of Reflector Curvature and Rotation*, Geophysics, 71, no. 5, p. 41-51, September-October, 2006, extend the dip and azimuth method of Marfurt et al. to include second order derivatives and use Roberts' measures to estimate curvature and rotation. Unlike Roberts's method for discrete picked horizons, the novelty of Dossary et al. method lies in its estimation of second derivatives of local time surfaces continuously in a volume. The disclosed method sets up covariance matrices of lagged cross-correlations of short time windowed signals. It computes eigenstructure based coherence. It then solves a set of linear equations whose dimensions increase with the order of polynomial. Finally, it applies low pass filtering to the result. The method is complex, computationally expensive, non-robust in the presence of noise, and requires many steps. Additionally, it does not provide a method for visualizing the result.

E

Faults from 3D Seismic Volume

Faults are first detected then picked. U.S. Pat. No. 6,018,498, issued Jan. 25, 2000, entitled Automated Seismic Fault Detection and Picking, issued to Neff et al. describes a method that inserts a set of local test planes that are variously dipping and rotating about a center point in a 3D seismic volume. The method computes the probability of that point lying on a fault plane. The probability is based on a measure of time horizon discontinuity via cross-correlation of time windowed signals and average amplitude difference between corresponding traces in adjacent parallel test planes. In the picking stage, the method applies a threshold and outputs probability strips on 2D horizontal time slices. Finally, the method connects strips that are in vertical proximity to define the fault surface. The method is computationally expensive because of the large number of test planes and evaluation of lagged cross-correlations needed.

Pedersen et al., SEG International Exposition and 72$^{nd}$ Annual Meeting, Oct. 6-11, 2002, entitled *Automatic Fault Extraction using Artificial Ants*, describes a method that has 3 steps. In the pre-conditioning step it enhances the signal-to-noise ratio of the data. In the detection step it uses statistical variance among laterally separated time windowed signals as a fault attribute. In the picking step it connects the 3D distributed fault attributes by a computer implementation of "swarm intelligence" used by ants to locate food. The method needs pre-conditioning the data to improve signal-to-noise ratio, is computationally expensive and fails where faults are not obvious.

Cohen et al., *Detection and Extraction of Fault Surfaces in 3D Seismic Data*, Geophysics, v. 71, no. 4, pp 21-27, July-August 2006, describes a different approach to measuring incoherency without having to compute eigenvalues, eigenvectors and principal components as in Marfurt's method. It sets up 2 small sub-volumes of seismic data that are laterally and vertically separated symmetric to a center "analysis point". The method orders samples in each sub-volume and creates a vector of data for each cube. Next, it computes a normalized difference between the vectors and calls the measure "Normalized Differential Entropy" or NDE. It tilts the two cubes by incrementing in small dip steps from the vertical and repeats the NDE computation for a range of positive and negative dips. It also repeats the NDE computation for a range of positive and negative azimuths by rotating the pair of cubes through small azimuth increments. The NDE deviates significantly from the average if a fault happens to pass through the analysis point and is aligned with the dip and azimuth orientations of the cube pair. The method goes through 3 more steps to enhance the NDE signal, and do directional filtering. The method does not provide visualization or picking.

Although more robust than Marfurt's method, the disclosed method is computationally expensive because of NDE estimations for each tilted and rotated cube pair. Data is decimated to reduce the computation load.

Although cross-correlation based "discontinuity" is the basic algorithm in prior art methods, yet its implementations differ widely among various methods. Some methods precondition data to suppress the noise while others do noise suppression within the discontinuity computation. Despite the diversity of their implementation all prior art methods suffer from disadvantages that are inherent in cross-correlation based methods as cited with reference to coherency in earlier Section B. A fundamental limitation of cross-correlation is that it estimates only a time delay but not a time delay spectrum that is needed to filter noise and detect dispersion.

SUMMARY OF THE INVENTION

The invention relates to a method to estimate the Time-Frequency Amplitude and Phase Spectra of a time varying signal. The method is the basis for analysis of signals that vary in both time and space. Examples from 3D seismic exploration of oil and gas illustrate applications of the method to estimate in a time-and-space varying manner the Time Delay between Windowed Signals, Dispersion, Attenuation, Wavenumber Spectra, Dip and azimuth, Curvature and Higher-Order Surfaces, and Faults. An apparatus allows an analyst to visualize and interpret results of the analysis on a graphical workstation.

BRIEF DESCRIPTION OF DRAWINGS

FIG. 11(*a*) shows a window of seismic section.

FIG. 11(*b*) shows white as low dips and black as high dips.

FIG. 12(*a*) shows a window of seismic section.

FIG. 12(*b*) shows white as dips to the right and black as dips to the left.

DETAILED DESCRIPTION

A

Time-Frequency Spectra

Figure 1:
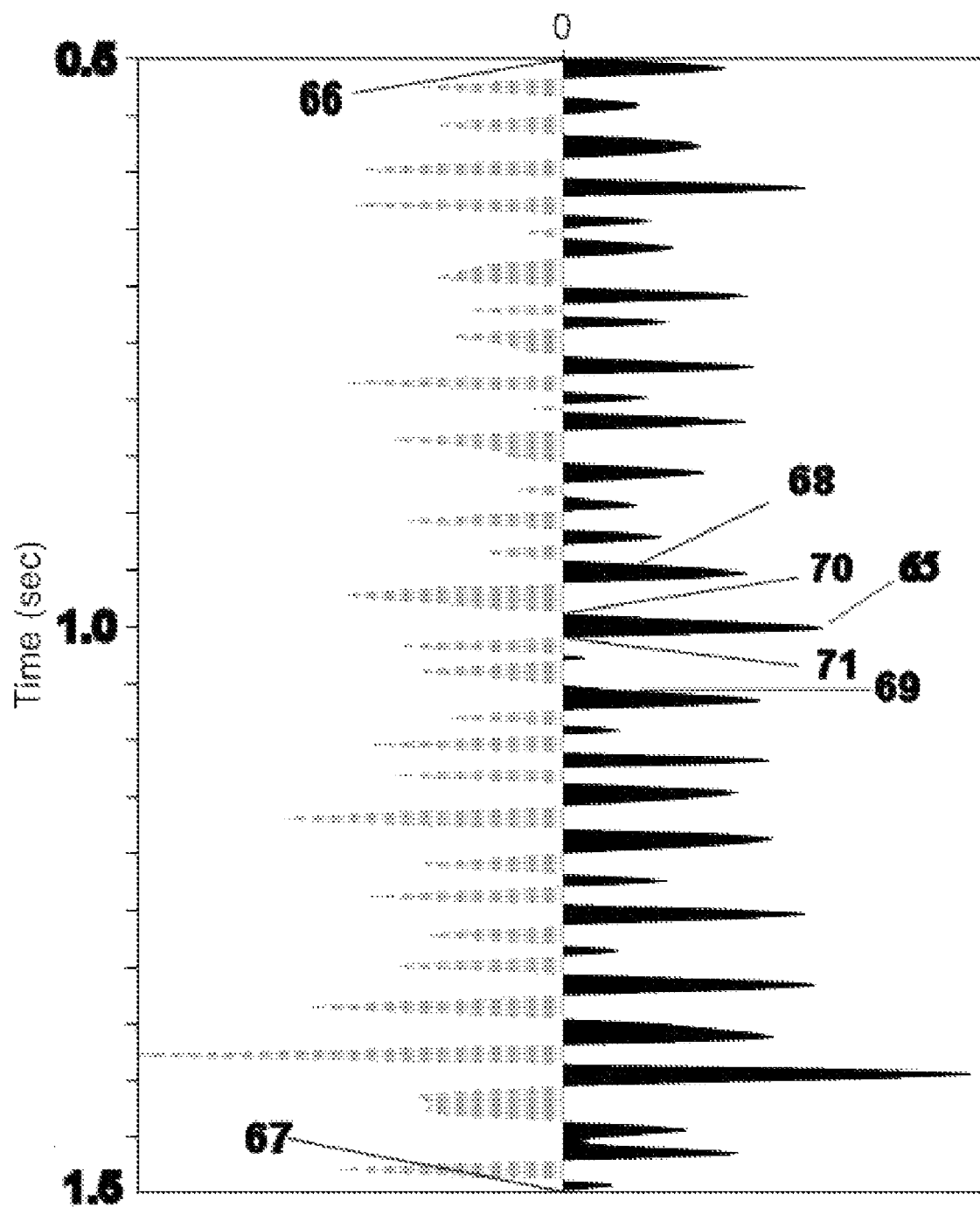
FIG. 1 shows a seismic trace segment, positives in solid black and negatives in hashed grey.

While prior-art methods of spectral analysis manipulate a short data window to obtain a spectrum, the method of this invention "un-windows" the short window then performs standard fast Fourier transform ("FFT") on the data. The key concept of the invention is to extrapolate the portion of the signal in the short window into a signal spread over a longer window. In doing so, a continuity relationship among data within and outside of the short window is used. Consequently, the long-window comprises original data present in the short-window plus its extrapolation that is not a tapered version of the original data in the long-window. However, the extrapolation depends on the continuity model and its parameters. Different choices of the model and the parameters will produce different FFT outputs. As a result, the method of this invention produces a FFT estimate and not the exact FFT, which as stated in the Background section will have poor frequency resolution.

The extrapolation is performed on a plurality of different length short-time windows that are centered at a target time. Each of the plurality of short-time windows is extrapolated to a same constant window length. The method averages the signal in a plurality of constant length windows then computes FFT of the average. The longer-time average window provides uniform high resolution frequency sampling. Next, the method increments the target time and repeats the analysis. The result is a complete orthogonal and invertible set of amplitude and phase spectra that are closely sampled at uniform intervals in time and frequency. In summary, present invention produces at each time sample an FFT estimate with finer frequency resolution than conventional FFT.

Difference: The FFT is performed on a longer-time window that comprises the actual signal in a short-time window at the center and its extrapolations to the extents of the longer-time window. Since extrapolations are a continuation of the central window the data outside of the window is an estimate of what would have been observed in the absence of interfering signals. This is different from methods previously known in the art that include interfering data from outside of the central window.

B

Time Delay Spectrum

The method estimates time delay and dispersion between laterally separate coherent signals. The method computes frequency-by-frequency differences between the phase spectra of signals at a constant time. Next, it divides each phase difference by the frequency to obtain a time delay for each frequency that is called 'Time Delay Spectrum' in this invention. It filters time delays in the frequency domain to remove noisy bands. It analyzes the trend on the graph of time delay spectrum. If there is no trend then it averages the result into a single robust time delay. On the other hand, if there is a trend then it fits a straight line or a polynomial through the time delay spectrum. Parameters of the straight line or polynomial identify whether the dispersion is normal or anomalous and provide a measure of its strength.

Difference: First, most methods previously known in the art compute time delay from the lag of cross-correlation function maximum. Repeated computation for each lag is expensive. Second, shortening of cross-correlation window produces a bias due to the DC level. Third, no prior art method computes frequency by frequency time delays and does frequency domain filtering to suppress interference. Fourth, prior art methods do not quantitatively determine or estimate dispersion.

C

Attenuation

Energy is absorbed as a seismic signal travels through the Earth. Higher frequencies lose more energy than lower frequencies during the same travel time. The time rate of absorption depends on frequency. The attenuation is the frequency rate of change of the absorption time rate. The computation of absorption rate requires amplitude spectra from short windows centered at a pair of reflectors in the Earth that are separated by the travel time. Most significantly there must be a sufficient number of amplitude-vs-frequency data points left after removing noisy frequency bands to make the computation reliable. The high frequency resolution feature of this invention provides a large number of points on the amplitude-vs-frequency graph. A linear least squares slope on the logarithm of amplitude ratio-vs-frequency graph, restricted to high signal-to-noise pass bands, provides a reliable measure of attenuation in the Earth interval between reflectors.

Difference: Prior art methods failed to reliably compute attenuation because of their inability to estimate with high frequency resolution the amplitude spectrum from time windows localized at discrete reflectors. The method of this invention enables that estimation.

D

Dip and Azimuth from 3D Seismic Volume

The multi-channel method computes the first-order lateral derivatives from a set of time delays of coherent signals relative to the signal at the center of a small horizontal area. The time and center trace may be anywhere in the larger seismic volume. The method fits a least squares plane to lateral time delays within the horizontal area. If the fitting error is larger than a threshold, the method iteratively deletes the time delay with the largest error and repeats the fitting of a plane until the error is smaller than a specified threshold or the number of remaining traces drops below another specified threshold. The two coefficients of the final plane are the first order lateral derivatives. The dip and azimuth are computed from these derivatives. Further, the rms error between the final plane and time delays in the starting set is computed. The dip, azimuth, and error is assigned to center time and saved.

So far it has been assumed that seismic waves are non-dispersive. Consequently, time delays are independent of frequency. However, there are seismic waves such as Rayleigh and Love waves that are dispersive. Indeed, such waves dominate the early part of an offshore seismic record. They are not analyzed and instead suppressed in routine seismic processing. The method of this invention enables the analysis of dispersive waves. Their analysis would require planes to be fitted to time delay spectrum instead of constant time delay. The result would be spectra of apparent time dips in the x- and y-directions instead of constant apparent dips.

Difference: First, no method previously known in the art performs iterative plane fitting that enables the suppression of noise on the output. Second, no prior art method provides apparent dip spectra.

E

Curvature and Higher Order Surfaces from 3D Seismic Volume

The method applies the basic plane fitting algorithm from Dip and Azimuth in an iterative loop to estimate the next higher order derivatives. It fits a new plane to each of the first order lateral derivatives. The four coefficients of two new planes are second order lateral derivatives. The plane fitting iteration continues and stops when either the highest desired order of lateral derivatives is reached or the misfit error is less than a prescribed threshold. In the case of highest second order, the method derives various curvature measures of local surfaces. The process is repeated as the time and center trace translates to the next location in the seismic volume. The method outputs 6 volumes of the first and second order lateral derivatives from a single seismic volume. These derivative volumes are transformed into curvature attribute volumes.

Difference: No method previously known in the art computes multi-order lateral derivatives via iterative application of a simple plane fitting algorithm.

F

Faults from 3D Seismic Volume

The method uses frequency domain filtered time delays followed by plane and/or curvature fitting. It multiplies the time surface misfit error and time-surface-following-amplitude surface misfit error to estimate a fault attribute.

Difference: No method previously known in the art computes discontinuity attribute based on frequency domain filtered time delays and iteratively fitted time surface coefficients.

G

3D Visualization in Color with Animation

This aspect of present invention includes 3D visualization of information obtained from the A-F estimation methods. The hardware and software system described by Alam in U.S. Pat. No. 6,278,949 B1 enables a user to visualize, animate, process and interpret 3D data in color. The foregoing system has been modified to include new types of data that are generated by this invention. In routine applications an interpreter combines geometrical and spectral amplitude and phase attributes of coherent surfaces developed in this invention through arithmetic, logical or 'what if' model operations into a new attribute. The interpreter then visualizes this 'new attribute' in color while animating on a 3D graphical screen to infer geological structure, stratigraphy, fractures or faults in order to locate probable locations of oil and gas reservoirs. However, figures in this example are restricted to 2D displays in black and white or grey scale only to illustrate examples but by no means restricting the method.

OPERATION AND EXAMPLES

A

Time-Frequency Spectra

Consider a data recording or signal from only one receiver, or only one data trace, referred to herein as a single "channel." Assume that (a) there are N data samples centered at time "T" of a digital record of the signal with $\Delta T$ representing the sample time interval; (b) an objective is to estimate an FFT of a short time window $m*\Delta T$ also centered at T with $m \ll N$, and (c) it is desired that the frequency sample interval have resolution with $\Delta f = 2/(M*\Delta T)$; where $M \gg m$. In a conventional FFT the frequency sample interval will be low resolution, with $\Delta f = 2/(m*\Delta T)$.

Without limiting the generality of this invention, the example shown in FIG. 1 includes a segment of input seismic trace, called N-window, which starts at time point shown at 66 and ends at a time point shown at 67. The desired frequency resolution window is called M-window. The following parameters are used in spectral estimation: $M=N=1000$, $\Delta T=0.001$ sec. and $T=1.0$ sec. The FFT will be estimated for a short segment, called the m-Window, that starts at time point 70 and ends at time point 71 with $m=20$. The signal value is shown as amplitude 65 at $T=1.0$ sec.

It is noted that the signal in m-window between time points 70 and 71 is only a snapshot of the continuous signal in N-window from time point 66 to 67. The m-window is a part of the continuum and the signal does not drop to zero outside of the window edges. Instead the signal in m-window is related with its outside neighbors through a continuity relationship. If it is possible to model this continuity relationship, it is possible to extrapolate the short m-window beyond its edges into a longer M-window that will provide higher frequency resolution than conventional FFT.

It is advisable that the model and its parameters should satisfy the following criteria:

1. The model should be such that extrapolated values taper off with increasing time from the m-window edges.
2. The model should be multi-resolution. That is, extrapolation should not be performed only once that is limited to the short m-window. Rather it should be performed on a sequence of expanding (m+j)-windows each centered at T with "j" being a variable integer. A few longer (m+j)-windows should be selected such that their extrapolations are non-zero at the edges of M-window.
3. The number of expanding windows and their lengths should be such that the average through superposition of all expanded M-windows has reduced side-lobes. Further, a normalized-magnitude of the side-lobes outside of the m-window should be less than a specified threshold. All extrapolations are consistent with the spectral content of the M-window.

In general, several mathematical models for extrapolation satisfy the foregoing requirements. See, for example, N. Wiener, *Numerical Recipes*, Ch. 16, pp 708-752, which discloses possible models including auto-regressive, auto-regressive moving average, and others. The choice of an appropriate model depends on the nature of the data. Without loss of the general methodology of this invention, it is possible to exemplify the extrapolation with the auto-regressive model (e.g., *Numerical Recipes*, p. 573) that is suitable for seismic data. The foregoing model assumes that the signal includes noise but is otherwise stationary over N-window. The extrapolation method produces Linear Prediction ("LP") coefficients by solving a recursive algorithm described in *Numerical Recipes*, p. 92.

A number, m, of LP coefficients can be computed by using the auto-correlation function of the M-window in the Levinson recursion. Convolution of the filter coefficients with data samples in m-window extrapolates the first signal value outside of the window in the forward direction. Then recursively apply this filter to the "m" samples that now comprise one extrapolated sample plus (m−1) contiguous samples from the previous window. The output of this convolution is the next extrapolated forward sample. The foregoing process is repeated for a number (M−m)/2 times in the forward direction. Then, reverse the order of LP coefficients sequence and convolve with m-window and repeat the extrapolation (M−m)/2 times in the backward direction. The forward and backward extrapolated length now comprises M samples symmetrically centered at time T.

Figure 2:
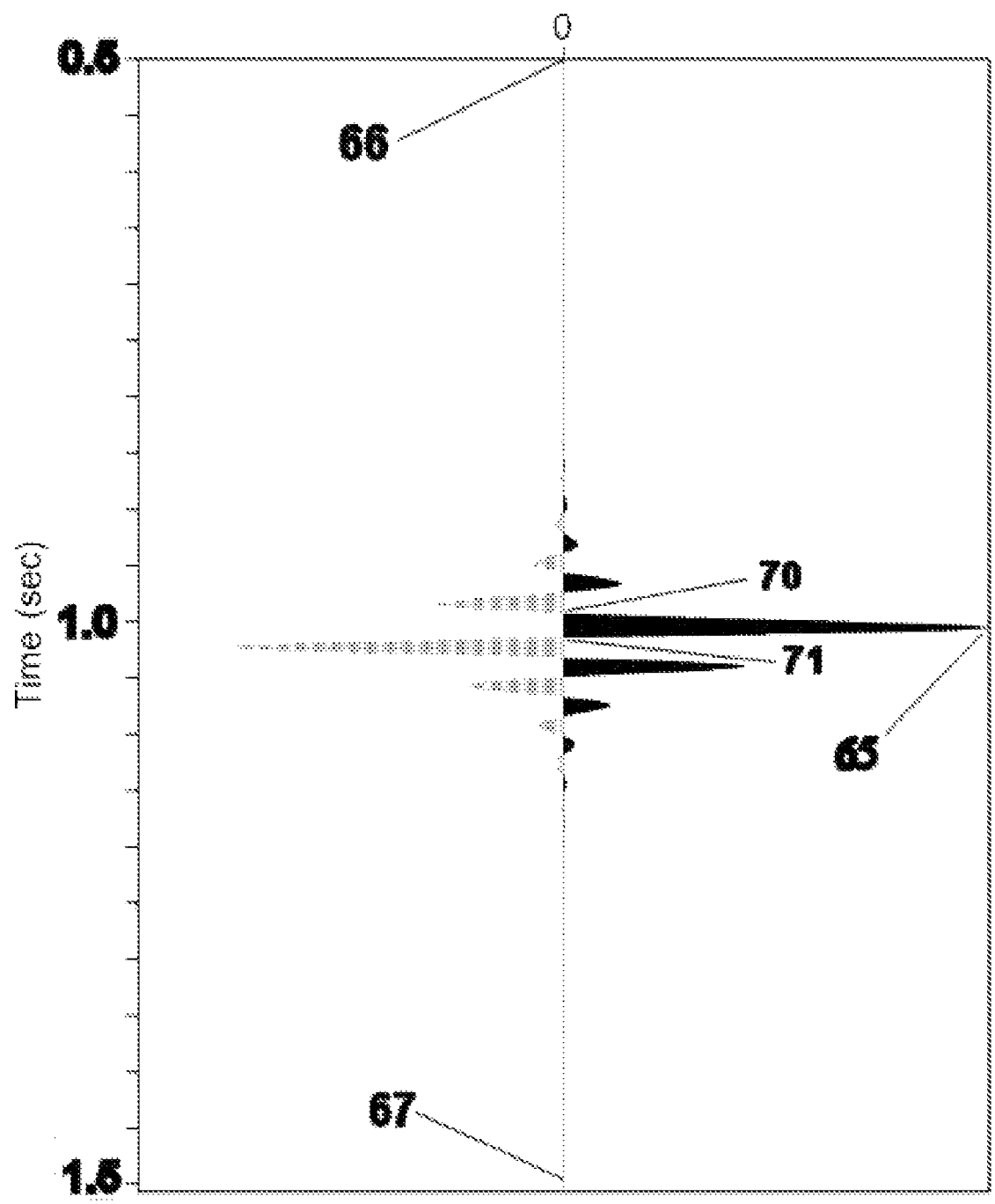
FIG. 2 shows a 20-millisecond window at the center of the trace after extrapolation.
Figure 3:
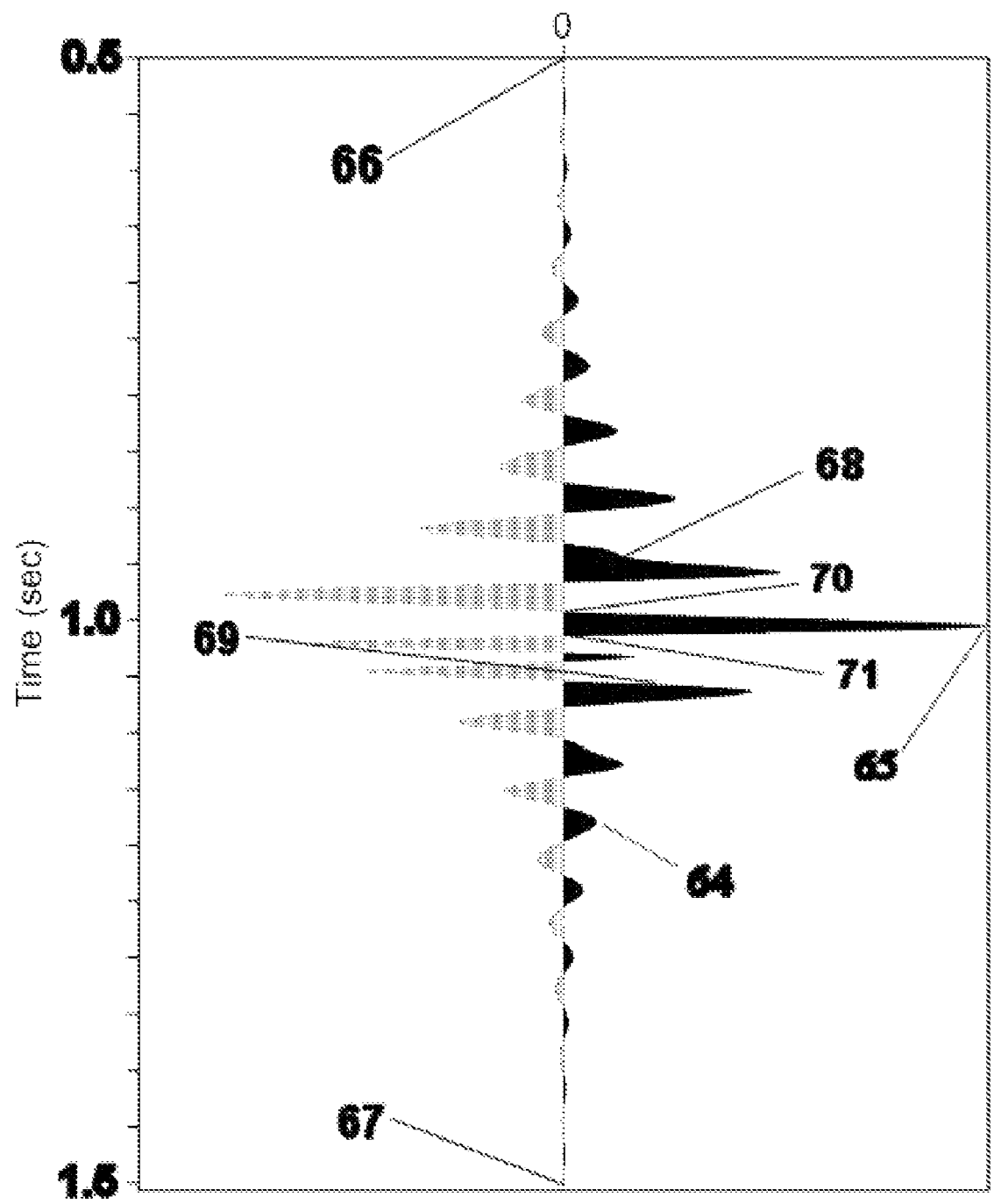
FIG. 3 (S)shows a 120-millisecond window at the center of the trace after extrapolation.

Next, a longer window of "m+j" samples is extrapolated while keeping it centered at T and again extend it to length "M". In FIG. 1 this longer window starts at 68 and ends at 69 with "m+j=120". FIGS. 2 and 3 show extrapolations of the two windows, each extended to length "M=1000". The signal value 65 in FIG. 1 and indeed all values within the m-window remain unchanged in extrapolated windows of FIGS. 2 and 3. However, notice that in FIG. 2 the extrapolation tapers off to zero before reaching the edges at time points 66 and 67. In contrast, the extrapolation in FIG. 3 has non-zero values, for example, amplitude 64, all the way up to the edges. A third intermediate window was used with "m+j=60" and also extrapolated it to length "M=1000". The window and its extrapolation is not shown as a figure. In practice, the extrapolation process is repeated for a selected set of "j" integers.

Figure 4:
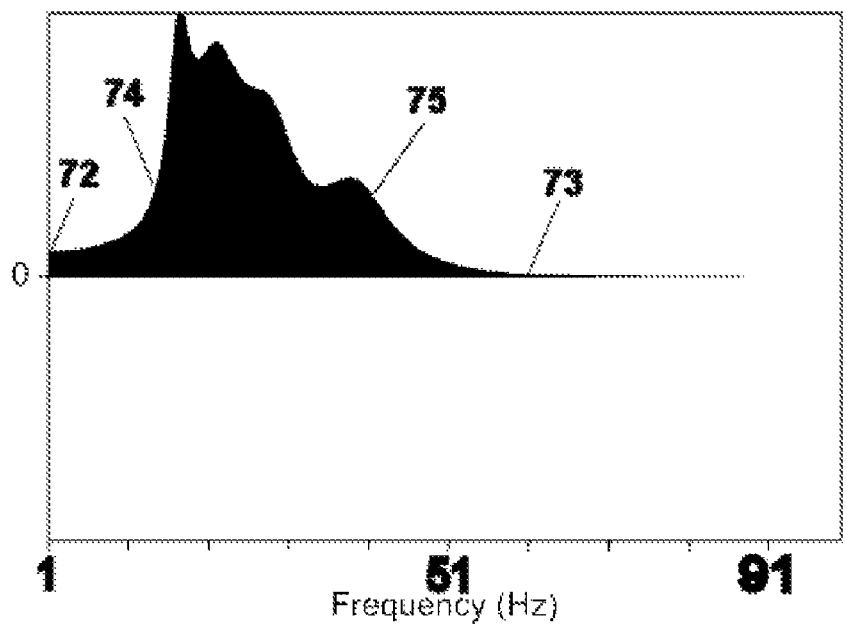
FIG. 4 shows an amplitude spectrum of the average of 3 extrapolated windows.
Figure 5:
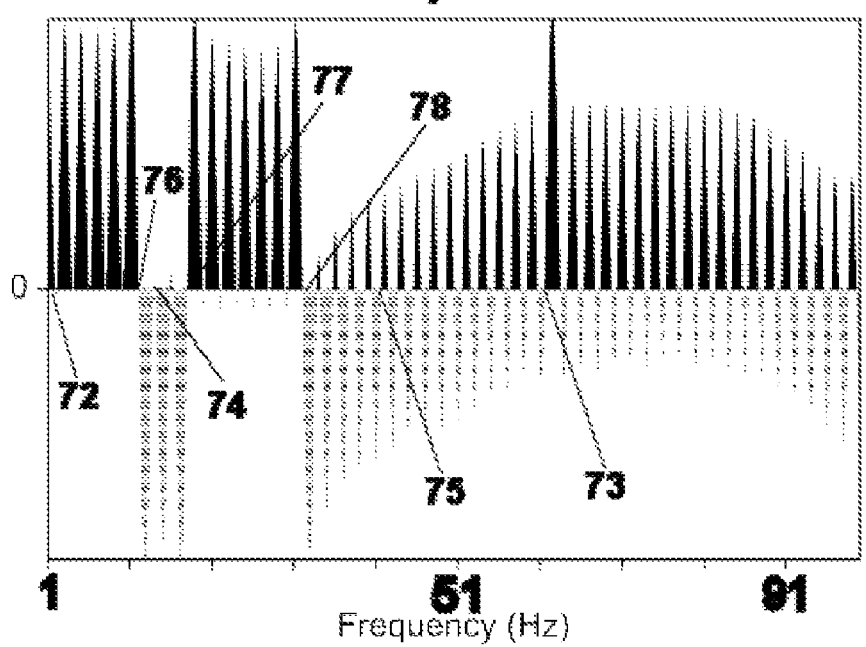
FIG. 5 shows a phase spectrum of the average of 3 extrapolated windows.
Figure 6:
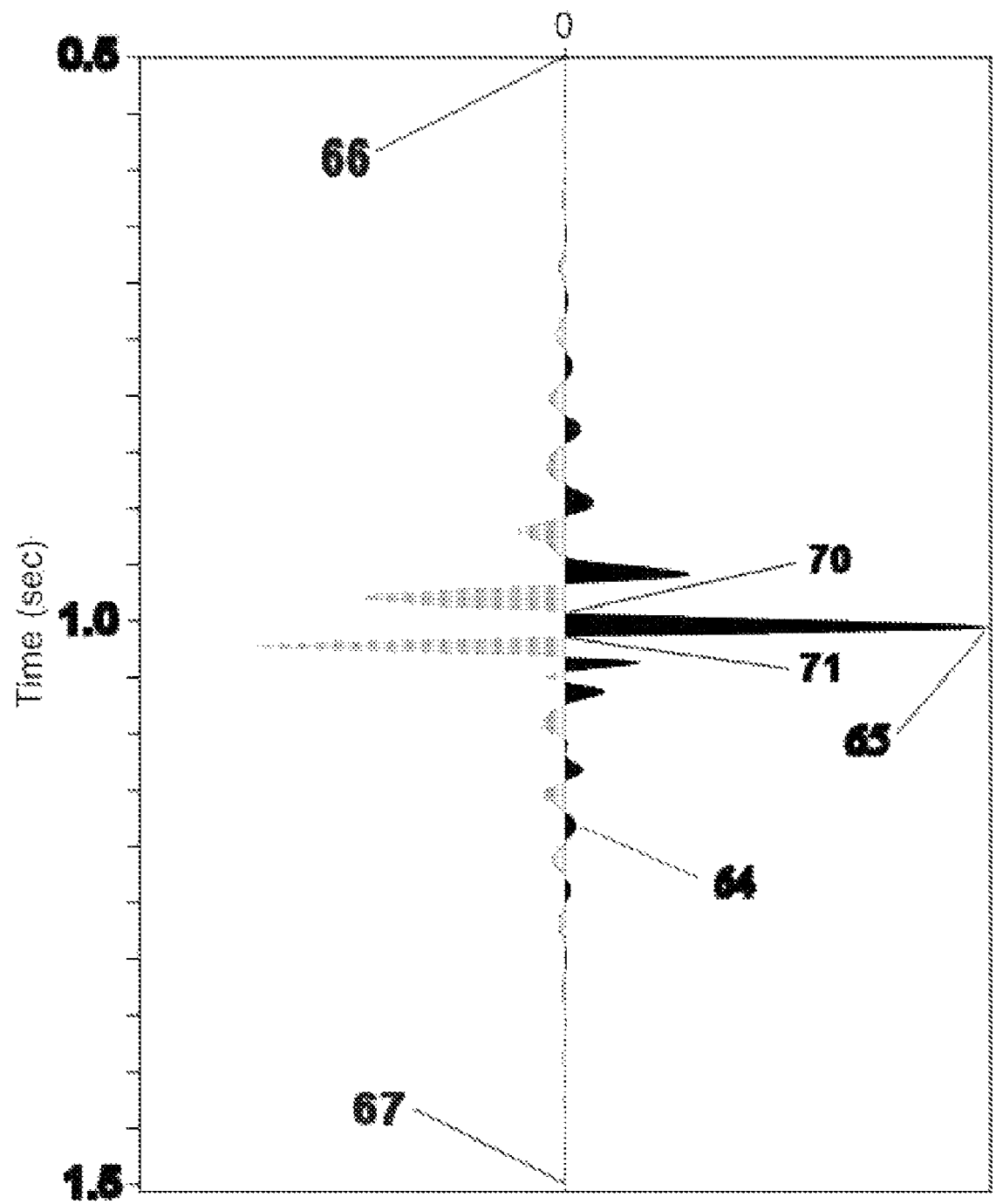
FIG. 6 shows inverse FFT of the amplitude and phase spectra in FIGS. 4 and 5.

Next, a window-by-window weighted average is calculated of all extrapolated M-windows. In this example, the 3 extrapolated windows are uniformly weighted to compute the average. Finally, the FFT of the weighted average is selected that produces amplitude and phase spectra at the desired frequency resolution, $\Delta f = 2/(M*\Delta T)$. The result is called an FFT estimate. FIGS. 4 and 5 show the amplitude and phase spectra of the average window. FIG. 6 shows the inverse FFT of the spectral pair. A comparison shows that side-lobes, e.g. amplitude 64, in FIG. 6 are smaller in magnitude than their equivalents in FIG. 3.

Figure 7:
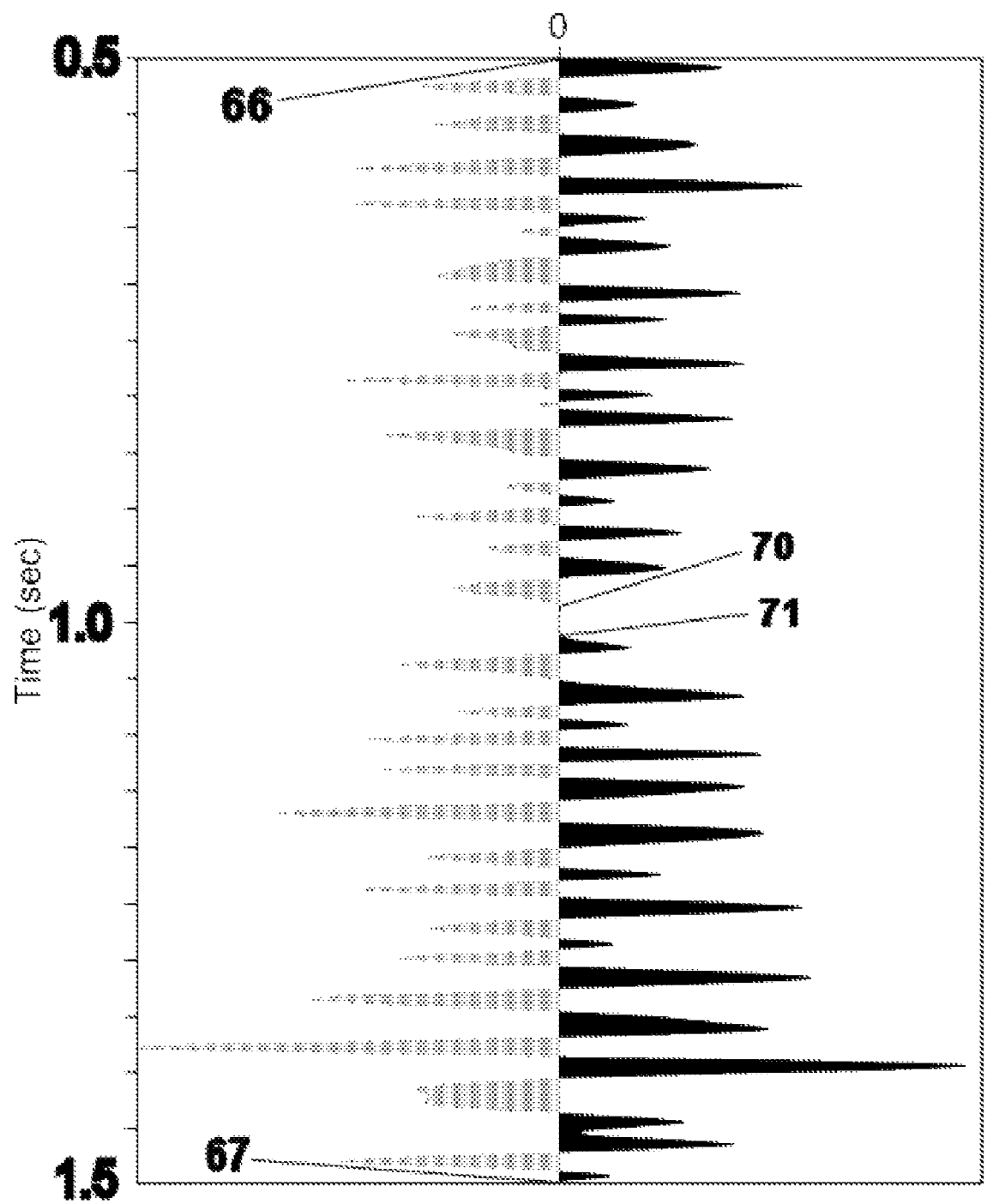
FIG. 7 shows the trace of FIG. 1 minus the inverse FFT trace of FIG. 6.

FIG. 7 shows the difference between the FIG. 1 input trace and FIG. 6 inverse FFT. Three observations can be made: (a) the signal value in m-window with edges 70-71 is exactly zero, showing that the FFT estimate reconstructs the exact signal within the window, (b) the signal outside is only slightly different from the input in the immediate neighborhood of edges 70-71, and (c) the signal is identical to the input trace further away from the edges. It is concluded that:

1. the spectral pair in FIGS. 4 and 5 is an FFT estimate of the short window, m=20; and
2. frequency resolution, $\Delta f=2$ Hz of the FFT estimate is 50 times finer than conventional FFT resolution, $\Delta f=100$ Hz, for the m=20 window.

Recall that the FFT estimate in FIGS. 4 and 5 is based on a uniformly weighted average of 3 symmetrically expanding windows with "m+j" lengths of 20, 60 and 120. A non-uniform weighting function would have enhanced spectral content of one expanded window relative to another. The choices of the number, specific "j" values, and the weighting function make the FFT estimate non-unique. For a given model, these parameters are optimally selected to reduce the side-lobes outside of the m-window to fall within a threshold. For a uniform weighting function we found that a practical choice is to select at least 7 expanding windows and to increment their lengths exponentially as a fraction between 2-20% of N-window from time point 66 to 67. This combination has given reliable spectra in a half-dozen seismic applications.

Then shift the center time from T to T+k*ΔT, where 1<=k<=m, and repeat the process through the computation of FFT estimate. The result is a pair of amplitude and phase spectra with frequency resolution, Δf=2/(M*ΔT), that is continuously estimated with a time resolution of k*ΔT. For the above example the frequency resolution is 2 Hz and time resolution 0.020 sec.

B

Time Delay Spectrum

Figure 8:
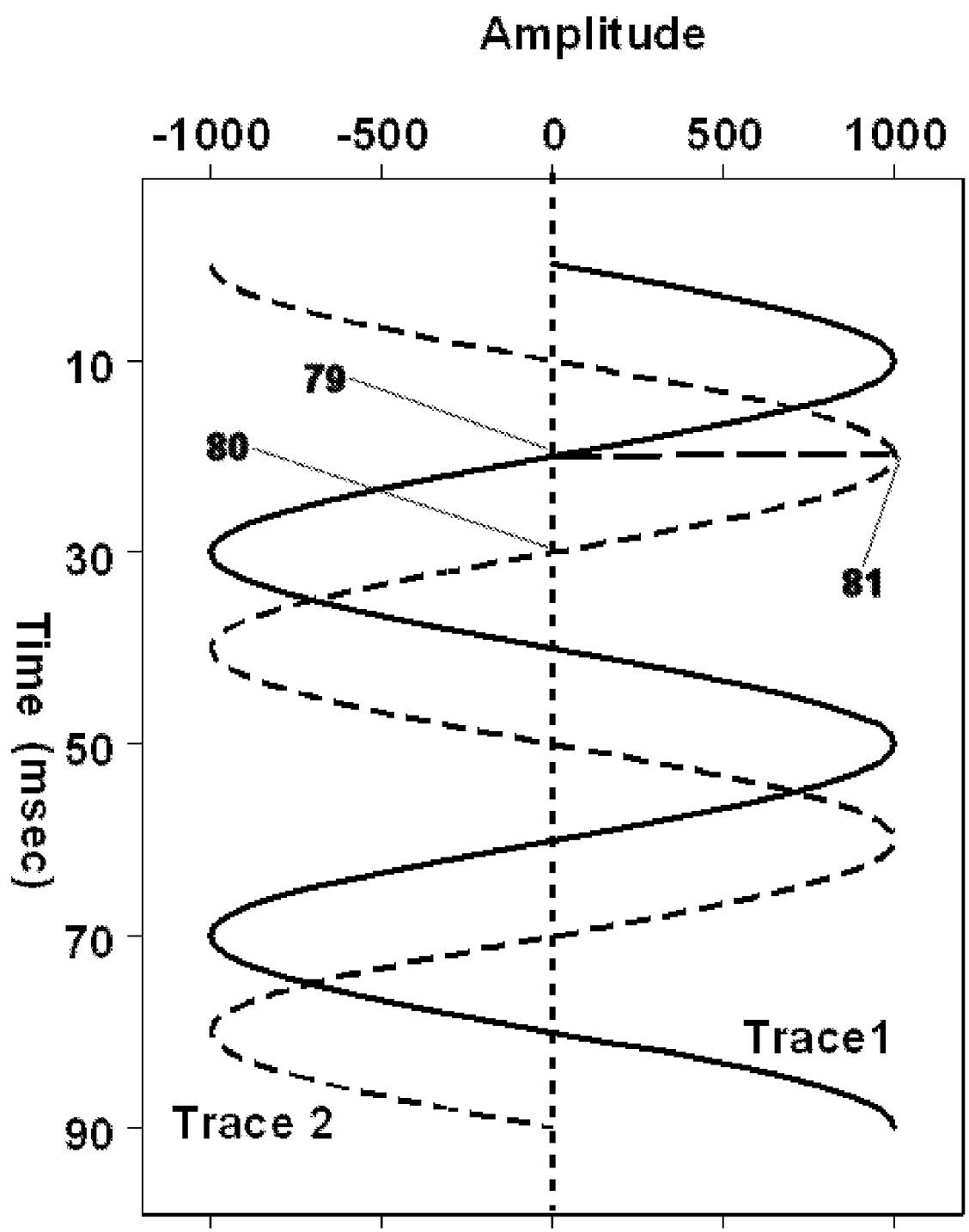
FIG. 8 shows two 25-Hz sinusoids, dashed sinusoid delayed by 10-ms relative to solid sinusoid.

Consider two 25 Hz monochromatic signals with a time delay. FIG. 8 shows the first signal as Trace 1 (solid curve) and the second as Trace 2 (dashed curve). The time difference between their nearest identical phases, e.g. zero crossings at time points 79 and 80, is 10 msecs. Their phase difference between amplitudes 79 and 81 at identical time of 20 msecs is π/2 radians. The phase difference, dφ(ω), and time difference, dt(ω), are related through the equation:

$$d\phi(\omega)=\omega*dt(\omega) \quad (4)$$

where ω=2π*f is in radians/sec. with frequency f in Hz and dt in secs.

Those skilled in the art will appreciate that this computation is limited by the condition that there is no aliasing between traces. That is, the time delay computation will remain the same if we delay or advance either trace by its period of 40 msecs.

In the case of signals that contain a band of frequencies rather than a single frequency, first is estimated the time-frequency spectra then compute at each time sample the time delay spectrum:

$$dt(\omega)=d\phi(\omega)/\omega. \quad (5)$$

C

Attenuation

Consider two reflectors located at times t1 and t2 on a seismic data trace. Application of the method of this invention to data windows centered at t1 and t2 provides their amplitude spectra. The amplitude spectra are normalized such that the amplitude at a reference frequency in both spectra is the same. Let the normalized amplitude spectra be A(t1, ω) and A(t2, ω). The energy absorption rate E(ω) is 2[ln(A(t1, ω)–ln(A(t2, ω)]/(t2–t1). Filter E(ω) by removing points in frequency bands where the mean amplitude from the two windows is below a specified threshold. The slope of a least squares line that is constrained to pass through zero at a specified reference frequency, ωref, and through filtered points on E(ω)-vs-ω graph gives an estimate of the attenuation parameter called 'Inverse Q'.

D

Dip and Azimuth

Now consider three traces distributed orthogonally on a Cartesian (dx, dy) grid in the 'x' and 'y' directions at (x,y,t), (x+dx,y,t) and (x,y+dy,t) where 't' is time. It can be assumed that the signal is identical on each trace but has a constant gradient called 'dip' that is oriented at an angle called 'azimuth' relative to the 'x' direction. Further, consider that the signal is no longer monochromatic. Instead its amplitude and phase spectral pair is: [A(ω), φ(ω)]. A unique aspect of this invention is to compute the time difference between traces from amplitude and phase in the frequency domain rather than from cross-correlation in the time domain. Dip and azimuth are computed in continuous time 't' after obtaining time differences among traces in orthogonal x- and y-directions. We unwrap the phase first. At a frequency ω, coefficients of the local gradient vector of phase φ across neighboring traces in the x- and y-directions, also called horizontal wavenumbers, kx(ω) and ky(ω), are:

$$kx(\omega) = \frac{d\phi(\omega)}{dx} = \omega\frac{dt(\omega)}{dx} \quad (6)$$

$$ky(\omega) = \frac{d\phi(\omega)}{dy} = \omega\frac{dt(\omega)}{dy} \quad (7)$$

where $$\frac{dt(\omega)}{dx} \text{ and } \frac{dt(\omega)}{dy}$$

are the (x, y) components of apparent time dip vector.

Next consider the case of many noisy traces distributed laterally across the grid. Fit, for each frequency, an optimal, e.g. least squares, plane to local phase differences relative to the phase at center trace in a small horizontal neighborhood. We compute the misfit error with increasing area of the lateral neighborhood. We use the misfit error to reduce the extent when the error shows a jump in order to avoid aliasing or crossing a discontinuity. Divide the plane gradient vector by the corresponding frequency ω to obtain the frequency-dependent apparent time-dip vector.

Seismic compressional (P) waves are non-dispersive in many observations. In such cases apparent time-dips are independent of frequency. However, we shall treat them as frequency-dependent to later average over frequencies for overcoming statistical deviations due to noise. An amplitude weighted average of individual apparent time-dip vector can be computed over frequency bands where the amplitude exceeds a threshold. That is, for all ω such that A(ω)≧Threshold, $$Anorm = \sum_\omega A(\omega) \quad (8)$$

$$\frac{dt}{dx} = (1/Anorm)\sum_\omega A(\omega)\frac{dt(\omega)}{dx} \quad (9)$$

$$\frac{dt}{dy} = (1/Anorm)\sum_\omega A(\omega)\frac{dt(\omega)}{dy} \quad (10)$$

The foregoing method of computing apparent time-vector can be called the "Lateral Derivative Estimator" or LDE, a name that shall be referred to again herein.

Finally, the real time-dip θ and azimuth α are computed $$\theta=\sqrt{(dt/dx)^2+(dt/dy)^2} \quad (11)$$

$$\alpha=\arctan\left[(dt/dx)/(dt/dy)\right] \quad (12)$$

The (θ, α) vector and the misfit error at (x, y, t) are stored at the center of the fitting plane.

Figure 9:
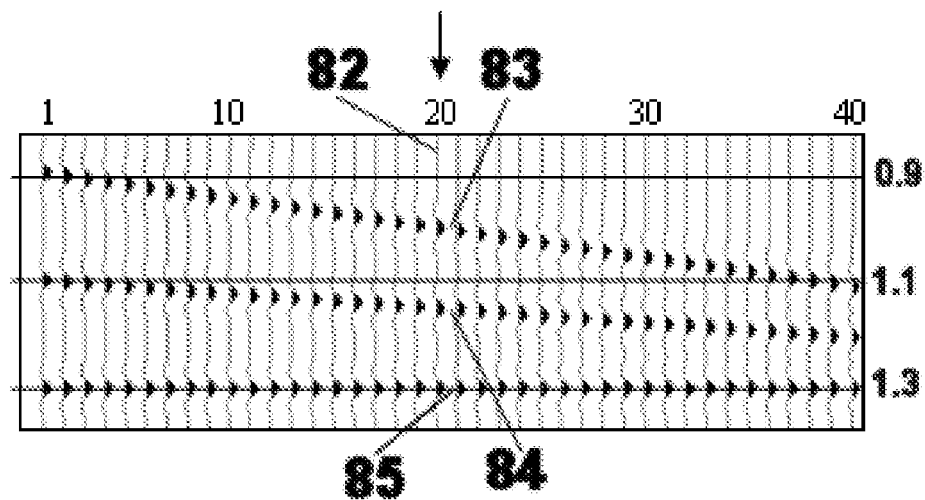
FIG. 9 shows synthetic 10-Hz Ricker wavelet section with reflector dips of 5-, 2.5, and 0-ms/trace.

The above dip computations are illustrated with a noise-free synthetic seismic section. Identical reflection coefficients from 3 variously dipping interfaces in the line direction were convolved with a 10 Hz Ricker wavelet. There was no dip in the cross-line direction in the creation of a 3D volume. FIG. 9 is a vertical section cut from this volume. Our focus is trace 82. The 3 seismic reflectors at times 83, 84 and 85 on trace 82 dip from left to right at 5.0 msec/trace, 2.5 msec/trace and zero msec/trace. The azimuth is zero since each cross-line section is identical. The objective is to estimate dips, not by tracking reflection times but by the application of LDE method at each time sample.

Figure 10:
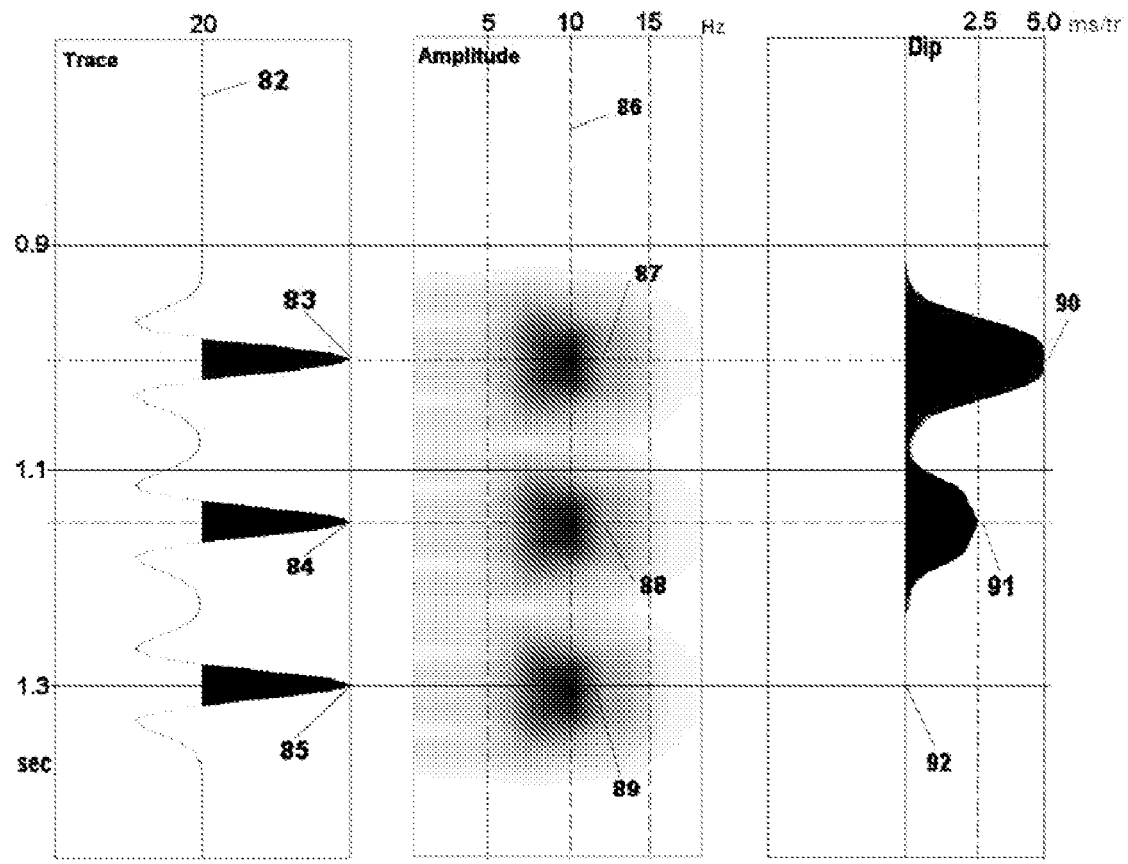
FIG. 10 shows (Left) Trace 20 in FIG. 9, (Middle) Amplitude Spectrum, (Right) Dip Trace.

The three panels in FIG. 10 show the results of dip computation by LDE method. The left panel shows a magnification of trace 82, the middle panel its amplitude spectrum and the right panel the dip estimate in continuous time. Note that signals at 83, 84 and 85 are exactly aligned horizontally in time with the centers of gravity of the amplitude spectrum 87, 88 and 89 in the middle panel. Further, note that the vertical line 86 corresponding to 10 Hz goes through the peak energy in the spectrum at each of the three signal times. Finally, notice that in the right panel the vertical lines through 90, 91 and 92 correspond to dips of 5.0 msec/trace, 2.5 msec/trace, and zero msec/trace. This example demonstrates that it is possible to quantitatively estimate dips from amplitude and phase spectra in continuously moving time.

FIG. 11(a) shows a window of an actual seismic data section with time increasing downward in the vertical direction and traces in the horizontal direction. The grey image is the seismic amplitude from negative values in white to positive values in black. FIG. 11(b) shows dip values overlaid as lines that follow each positive and negative extreme amplitude values in the background grey scale image. Large dips, 93 and 95, are colored white regardless of their azimuth whether to the left or right. Low dips, for example 94, are colored black.

FIG. 12(a) shows a different window of real seismic section in grey scale. FIG. 12(b) shows an overlay of azimuth values in black and white posted at each peak and trough of seismic grey scale image. Both events 116 (white) and 117 (black) have approximately the same dip but have different colors because they have opposite azimuths. Event 116 dips to the right and event 117 to the left. In contrast events 118 and 119 have different dips yet both are colored black because they dip to the left. So a reflection volume can be partitioned by color according to the azimuth of its dip. A seismic interpreter is quickly able to segment the volume into bodies of layers having common dip, azimuth or both together.

E

Curvature and Higher Order Surfaces from 3D Seismic Volume

Time surfaces in a seismic volume may be curved and a polynomial fit may be of any order. This invention is different from others in its ability to identify the local surface of any order with repeated application of a simple LDE algorithm.

The first pass of LDE application on a volume of seismic data provides at each (x, y, t) point the first order coefficients of any order polynomial. These coefficients, in terms of A. Roberts (2001) terminology are:

$$d(x,y,t)=dt/dx \qquad (13)$$

$$e(x,y,t)=dt/dy \qquad (14)$$

In the second pass, LDE is applied to the d(x,y,t) volume of data. This provides two coefficients of the second order polynomial:

$$a(x,y,t)=d^2t/dx^2 \qquad (15)$$

$$p(x,y,t)=d^2t/dxdy \qquad (16)$$

In the third pass, LDE is applied to the e(x,y,t) volume of data. The result provides two different coefficients of the second order polynomial:

$$b(x,y,t)=d^2t/dy^2 \qquad (17)$$

$$q(x,y,t)=d^2t/dydx \qquad (18)$$

Set:

$$c(x,y,t)=0.5(p(x,y,t)+q(x,y,t)) \qquad (19)$$

$$r(x,y,t)=(p(x,y,t)-q(x,y,t)) \qquad (20)$$

Ideally, r(x,y,t)=0.

When c(x,y,t)≠0 the implication is that principal axes of the surface are rotated relative to the Cartesian axes (x, y).

One can continue running recursive passes by applying LDE to results of the previous pass until the error from LDE fitted plane drops below a threshold. The methodology allows the computation of all curvature attributes defined by Roberts (2001) and computation of new ones for higher than second order polynomial surfaces. The computation does not require complex eigenstructure based coherence analysis or solution of increasingly high dimension linear equations as does the Al Dossary et al. (2006) prior art method.

Figure 13:
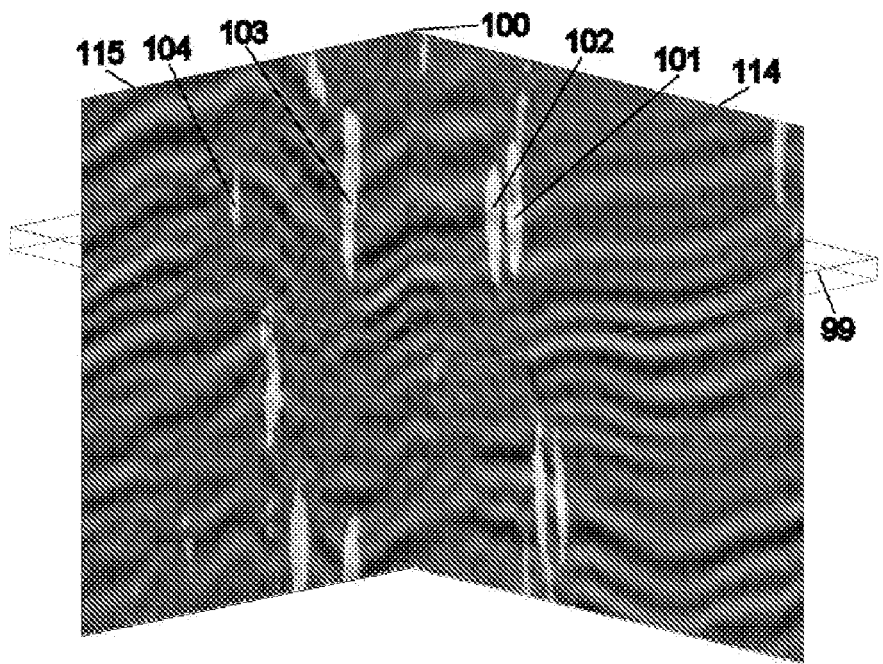
FIG. 13. shows a perspective view of 2 seismic sections making a corner wall with white vertical segments showing locations of high curvature.

An application of this invention to real data illustrates the use of K+ and K− curvature attributes in seismic volume interpretation. FIG. 13 shows a perspective view of orthogonal seismic sections 114 and 115 that intersect along a vertical line 100. The grey scale shows seismic sample values. A thin slab 99 without any data inside is shown for reference to be used later. White vertical features on seismic sections are overlays of K+ and K− values that exceed selected thresholds. For example, 101 and 102 correspond to the upthrown- and downthrown-sides of a fault. Feature 103 corresponds to a valley and 104 corresponds to a ridge of folded layers.

Figure 14:
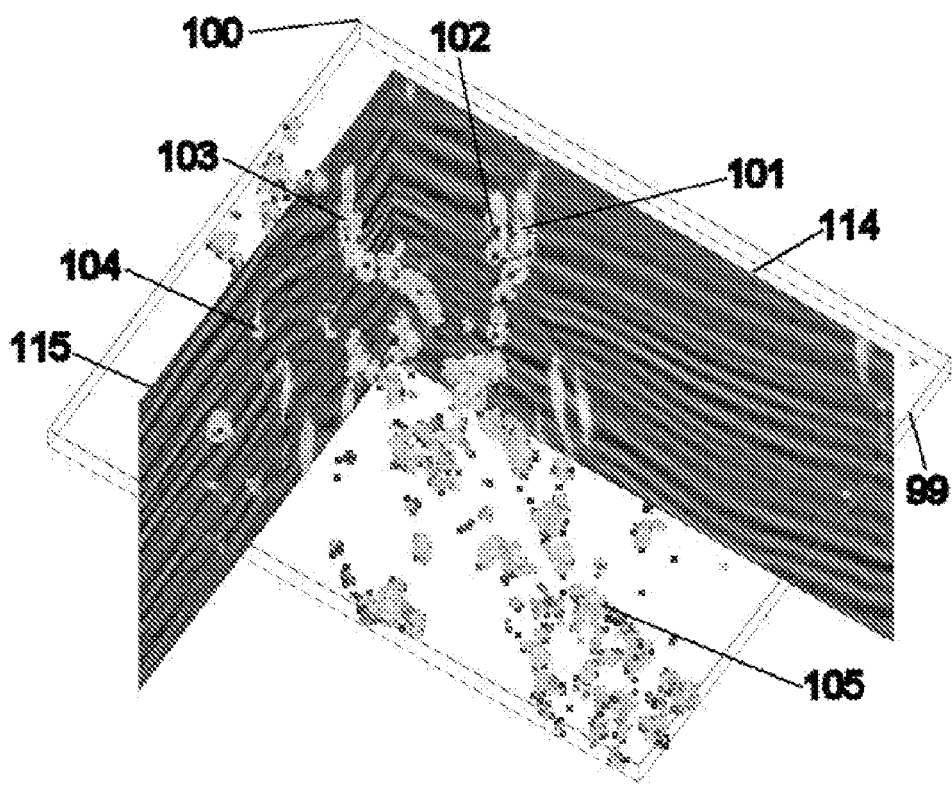
FIG. 14. shows the seismic sections of FIG. 13 making a corner wall and high curvature white-grey segments splashed inside a thin 3D slab.

FIG. 14 is also a perspective view similar to FIG. 13 except that the thin slab is now filled with K+ and K− attributes. Notice extensions of features 101, 102, 103, and 104 away from the seismic sections into 3D space. Feature 105 is an example of such an extension.

Figure 15:
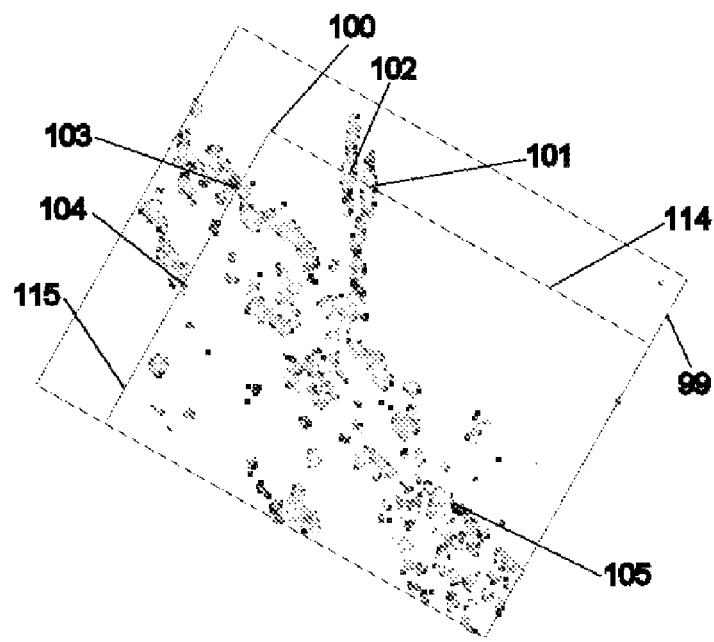
FIG. 15. shows a map view of white-grey high curvature showing lineaments of ridges and valleys.

FIG. 15 is a map view of a larger survey area. Interpreters map the extents and orientations of faults. They also map ridges and valleys to optimize the location of a probable oil and gas prospect. The entire process takes only a few minutes on a typical computer. Without the combination of this invention with the apparatus for visualization the interpreters will have to spend hours to reach the same conclusion.

F

Faults from 3D Seismic Volume

The multi-channel method is applied to detect and map 3D fault surfaces that connect near-vertical discontinuities. First, a curvature indicator is computed from lateral second derivatives. Second, a time-surface error and time-surface following amplitude-surface error is computed. The two errors and the curvature are normalized then multiplied together. The product is called a fault indicator. A vertically long sub-volume centered at each point in the larger seismic volume is searched for fault indicators with values greater than a threshold. Points that pass the search are connected to make a fault surface.

Figure 16:
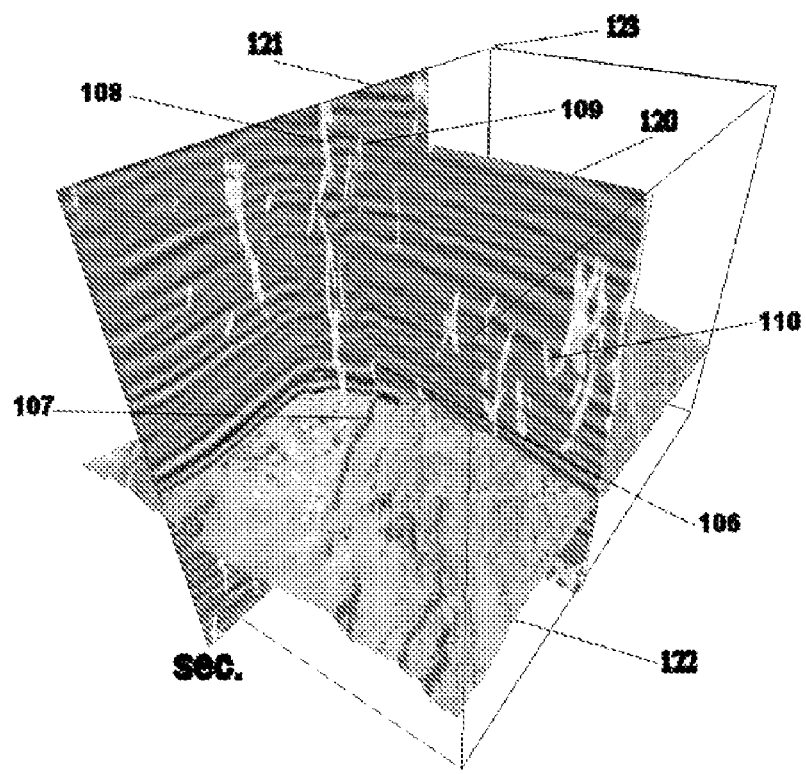
FIG. 16. shows a perspective view of 2 seismic sections making a corner wall and a picked horizon making the floor with white-grey vertical segments showing faults in 3D.

FIG. 16 is a 3D perspective view of a rectangular data volume. The corner 123 is furthest away in the view. Vertical seismic sections 120 and 121 intersect at a right angle. A picked horizon 122 lies near the base of seismic sections. An interpreter adjusts a threshold interactively to highlight fault values that exceed the threshold. The fault 106 on the seismic section 120 can be seen to follow on horizon 122 from the section towards the viewer. The fault edge 107 is indicated on the horizon.

The fault 108 is apparent and has visibly large displacement. Fault 110 is also apparent but has small displacement. Fault 109 is not visually apparent as seismic amplitude but is detected by the method of this invention from phase and curvature sensitivity. If we had filled the entire volume with fault indicator values it would be dense cluster of points. Range threshold and rotation of the volume about any combination of the 3 principal axes would show the alignment of faults in 3D space. The objective of an interpreter is to pick only those faults that critically control the target structure.

Figure 17:
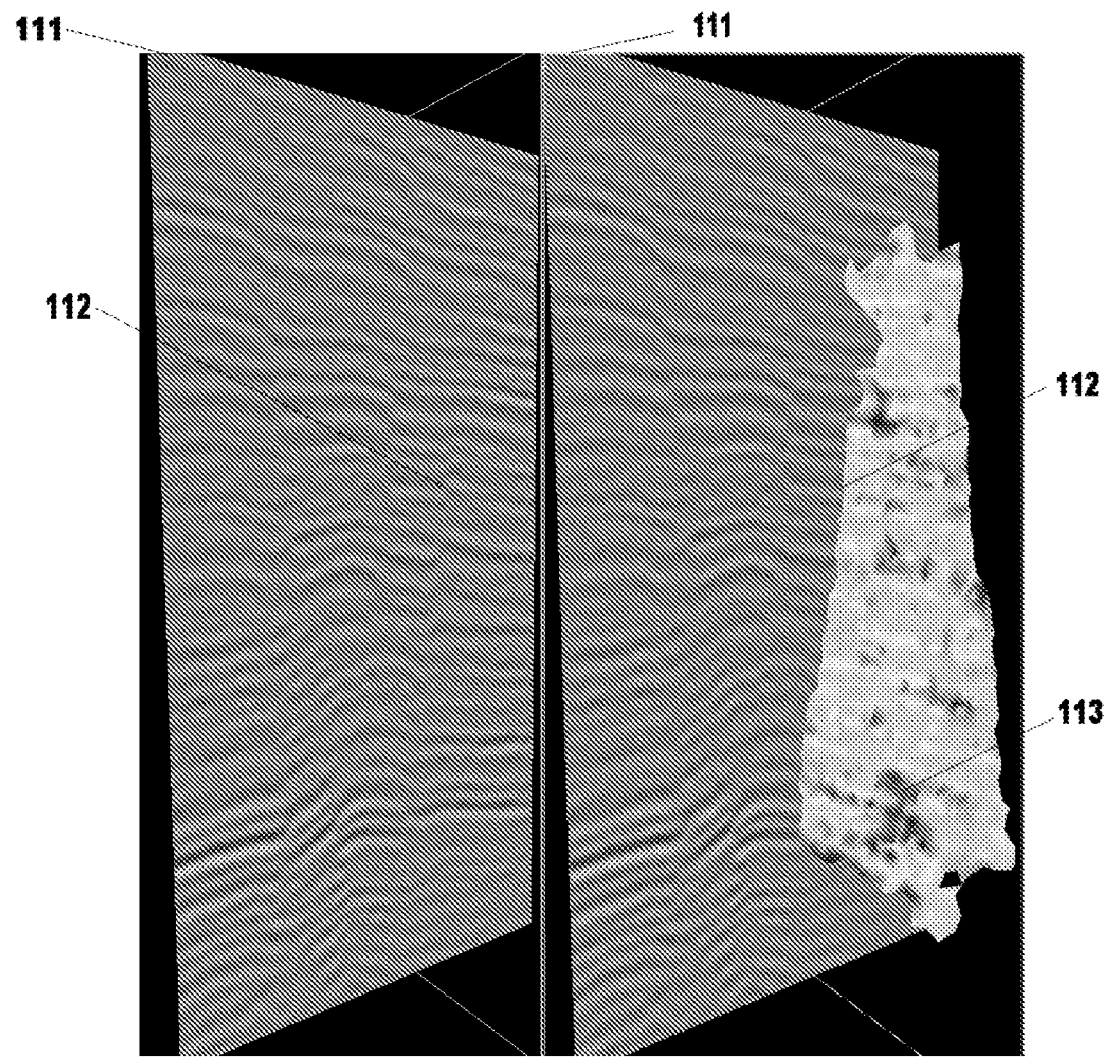
FIG. 17. shows a perspective view of a seismic section with multiple faults and the seismic section and intersecting fault plane with an overlay of seismic amplitudes on the fault plane.

The two panels in FIG. 17 illustrate the picking operation. The left panel in FIG. 17 shows a vertical seismic section 111 cut out from the volume such that fault 112 is clearly visible. The interpreter selects 112 on the fault as a seed point. With the seed point as apex the method searches in a vertical double cone to find a set of neighbor fault points. Those neighbors spawn new seed points and the fault continues to grow into a near vertical cluster of points. The process stops when it cannot find fault points that have passed the threshold. Rather than save the entire cluster, the method finds interlinked triangular facets that fit planar points in the cluster. Finally, seismic amplitude or any other attribute is overlaid onto the fault surface. The right panel in FIG. 17 shows the input seismic section with the seismic overlay 113 on the fault surface. It also shows the initial seed point 112. Notice the bright amplitude 113 that could be a possible target for drilling.

G

Conclusions

The methods of the invention according to above described implementations were applied using a computer program written in C++, Open GL, and Visual C++ computer languages on a standard Personal Computer (PC) Workstation. The methods provide high resolution, accurate data outputs and 3D visualization apparatus provides the speed and ease of use for interpretation and analysis of 3D seismic volumes.

The method of this invention takes multiple short windows of a signal centered at a point and extrapolates them into windows of a much longer constant duration. The method then averages extrapolated long windows. The extrapolation uses continuity relationship between data inside and outside of each short window. Fast Fourier Transform of the average long window provides not only high resolution in the frequency domain but also very accurate phase spectrum. Phase differences among multi-channel signals at a constant time allow the computation of wavenumber spectrum and wavefront curvature. Applications to 3D seismic exploration for oil and gas are illustrated by direct visualization of time-and-space varying amplitude and phase spectra, dip and azimuth, curvature and faults on a graphical screen. Thus the method produces high resolution results from the analysis of signals that vary in time and space without the artifacts and resolution limitations imposed by localizing the signal as is the case with other methods. The 3D visualization apparatus enables an interpreter to quickly and easily infer from the results probable locations of oil and gas reservoirs.

This invention has been explained in terms of seismic surveying. However, the invention has application to any form of data resulting from sensing a time varying parameter, such as microphone and electronic signals in speech, radar, sonar, radio, space communication, electron microscopy and medical remote sensing fields.

While the invention has been described with respect to a limited number of embodiments, those skilled in the art, having the benefit of this disclosure, will appreciate that other embodiments are possible without exceeding the scope of the invention. Accordingly, the invention is limited in scope only by the appended claims.

We claim:

1. A method for estimating amplitude and phase spectra of data consisting of time-varying sensor signals sampled continuously in time with uniform high frequency-resolution, comprising:

(a) obtaining a representation of said data sampled at an input ($\Delta T$) time-rate wherein the data are acquired by deploying a plurality of seismic sensors proximate a surface of the earth or in a body of water, the data representing seismic amplitude detected by the sensors with respect to time in response to actuation of a seismic energy source;

(b) specifying an output sample time-rate ($\Delta T'$) that is an integer multiple of $\Delta T$;

(c) specifying a data analysis window $\Delta t$ that is larger than the output sample time rate ($\Delta T'$), wherein the analysis window is an integer multiple of $\Delta T$;

(d) specifying a frequency sample rate ($\Delta f$);

(e) computing in a processor a time window ($2/\Delta f$) that would produce the frequency sample rate and that is an integer multiple of the input time rate ($\Delta T$);

(f) generating in the processor a model that extrapolates data inside the data analysis window to fill the frequency sample rate ($2/\Delta f$) window, wherein (g) the model uses a continuity relationship between data within and data outside of the data analysis ($\Delta t$) window, (h) wherein the model has the property that forward and backward extrapolated values decrease in amplitude with respect to time from edges of the data analysis ($\Delta t$) window, (i) capturing data in the processor within the data analysis ($\Delta t$) window at a start of data time;

(j) extrapolating in the processor in forward and backward directions the captured data to fill the ($2/\Delta f$) time window;

(k) computing fast Fourier transform (FFT) coefficients in the processor for the data in the ($2/\Delta f$) time window;

(l) incrementing in the processor by the output sample time ($\Delta T'$) from the start time of data capture for a next FFT computation;

(m) repeating (i) through (l) until an end of data time is reached; and at least one of (n) saving in a storage medium the FFT coefficients sampled at ($\Delta T'$, $\Delta f$) intervals, and (o) saving in the storage medium a transformation of the FFT coefficients into amplitude and phase spectra sampled at ($\Delta T'$, $\Delta f$) intervals.

2. The method of claim 1 wherein:

(a) the mathematical model is a statistical Linear Prediction Filter (LPF) model;

(b) the continuity relationship is an autocorrelation function with a maximum lag, Lmax, of said data in a time window of length, $(2/\Delta f)$, that is symmetrically centered relative to a moving data time window of length $\Delta t$; and (c) the forward extrapolation is done with repeated application of a minimum phase filter derived via Levinson recursion from the autocorrelation function and backward extrapolation is done with repeated application of the time reversed version of the minimum phase filter.

3. The method of claim 2 further comprising:

(a) computing the auto-correlation function in the processor of the signal in a $(2/\Delta f)$-window to determine statistical correlation between the signal within and outside of a signal analysis window, (b) using the auto-correlation function to compute LP coefficients in the processor via Levinson recursion and linearly combining said coefficients with analysis window in a recursive loop for extrapolations in the forward direction and then repeating said linear combination with the reversed sequence of said coefficients for extrapolations in the backward direction, (c) specifying a plurality of multi-resolution data analysis windows, where each such multi-resolution data analysis window has a different length, the length being in a range from said $\Delta t$ to a selected fraction of said $(2/\Delta f)$;

(d) initializing the start of spectral computation time;

(e) capturing data within said plurality of multi-resolution signal analysis windows, each centered at the spectral computation time;

(f) computing a sequence of LP coefficients in the processor for each multi-resolution window;

(g) extrapolating captured data in the processor in each multi-resolution window in forward and backward directions to fill said $(2/\Delta f)$-window;

(h) averaging data over plurality of multi-resolution extrapolated $(2/\Delta f)$-windows in the processor to compute an average $(2/\Delta f)$-window;

(i) computing FFT coefficients in the processor for the average $(2/\Delta f)$-window;

(j) incrementing spectral computation time by $\Delta T'$;

(k) repeating (e) through (j) until an end of spectral computation time;

(l) at least one of storing said FFT coefficients as 2-dimensional arrays sampled at $(\Delta T', \Delta f)$ intervals, saving in said storage medium a transformation of said FFT coefficients into amplitude and phase spectra as 2-dimensional arrays sampled at $(\Delta T', \Delta f)$ intervals, and (m) displaying the amplitude and phase spectra as 2-dimensional images on an interactive graphical screen.

4. A method for estimating amplitude and phase spectra of seismic data sampled continuously in time with uniform high frequency-resolution, comprising:

(a) obtaining a representation of the seismic data sampled at an input time rate $(\Delta T)$, wherein the data seismic are acquired by deploying a plurality of seismic sensors proximate a surface of the earth or in a body of water, the data representing seismic amplitude detected by the sensors with respect to time in response to actuation of a seismic energy source;

(b) specifying an output time-rate $(\Delta T')$ that is an integer multiple of the input time rate $\Delta T$;

(c) specifying a data analysis window $(\Delta t)$ that is larger than the output time rate $(\Delta T')$, wherein the analysis window is an integer multiple of said $\Delta T$;

(d) specifying a frequency sample rate $(\Delta f)$;

(e) computing in a processor a time window $(2/\Delta f)$ that would produce the frequency said sample and is an integer multiple of the input time rate $(\Delta T)$;

(f) generating a model in a processor that extrapolates data inside the data analysis window to fill the $(2/\Delta f)$ time window, wherein (g) the model uses a continuity relationship between data within and outside of the data analysis $(\Delta t)$ window, (h) the model has the property that forward and backward extrapolated values decrease in amplitude with respect to time from edges of the data analysis $(\Delta t)$ window;

(i) capturing data within the data analysis $(\Delta t)$ window at a start of data time;

(j) extrapolating in forward and backward directions the captured data in the processor to fill the $(2/\Delta f)$ time window;

(k) computing fast Fourier transform (FFT) coefficients in the processor of data in the $(2/\Delta f)$ time window;

(l) incrementing by the output sample time $(\Delta T)'$ the start time of data capture for a next FFT computation;

(m) repeating (i) through (l) until and end of data time is reached; and at least one of (n) saving in a storage medium the FFT coefficients sampled at $(\Delta T', \Delta f)$ intervals, and (o) saving in the storage medium a transformation of the FFT coefficients into amplitude and phase spectra sampled at $(\Delta T', \Delta f)$ intervals.

5. The method of claim 4 wherein:

(a) the mathematical model is a statistical Linear Prediction Filter (LPF) model, (b) the continuity relationship is an autocorrelation function with a maximum lag, Lmax, of said seismic data in a time window of length, $(2/\Delta f)$, that is symmetrically centered relative to a moving said data time window of length $\Delta t$, and (c) the forward extrapolation is done with repeated application of a minimum phase filter derived via Levinson recursion from the autocorrelation function and backward extrapolation is done with repeated application of the time reversed version of the minimum phase filter.

6. The method of claim 5 further comprising:

(a) computing an auto-correlation function in the processor of the data in a $(2/\Delta f)$ window to determine statistical correlation between the data within and outside of the signal analysis window, (b) using the auto-correlation function to compute LP coefficients in the processor via Levinson recursion and linearly combining said coefficients with analysis window in a recursive loop for extrapolations in the forward direction and then repeating said linear combination with the reversed sequence of said coefficients for extrapolations in the backward direction, (c) specifying a plurality of multi-resolution data analysis windows, where each of the multi resolution data analysis windows has a different length, wherein the length thereof is in a range from $\Delta t$ to a fraction of $(2/\Delta f)$, (d) initializing a start of spectral computation time, (e) capturing data in the processor within the plurality of multi-resolution signal analysis windows, each centered at the spectral computation time, (f) computing a sequence of LP coefficients in the processor for each multi-resolution window, (g) time extrapolating captured data in the processor in each of the multi-resolution windows in forward and backward directions to fill the $(2/\Delta f)$-window, (h) averaging data in the processor over plurality of multi-resolution extrapolated $(2/\Delta f)$-windows, (i) computing FFT coefficients in the processor of data in said average $(2/\Delta f)$-window, (j) incrementing spectral computation time by said $\Delta T'$,
(k) repeating steps (e) through (j) until an end of spectral computation time,
(l) at least one of storing said FFT coefficients as 2-dimensional arrays sampled at $(\Delta T',\Delta f)$ intervals and saving in said storage medium a transformation of said FFT coefficients into amplitude and phase spectra as 2-dimensional arrays sampled at $(\Delta T',\Delta f)$ intervals, and
(m) displaying the amplitude and phase spectra as 2-dimensional images on an interactive graphical screen.

\* \* \* \* \*